US012639725B2

(12) United States Patent
Jogaikar et al.

(10) Patent No.: US 12,639,725 B2
(45) Date of Patent: May 26, 2026

(54) DYNAMICALLY GENERATING PLATFORM RESOURCES BY GUIDING USER RESPONSES

(71) Applicant: Qualtrics, LLC, Provo, UT (US)

(72) Inventors: Rohit Raghunandan Jogaikar, Issaquah, WA (US); Anmol Matada, Kirkland, WA (US)

(73) Assignee: Qualtrics, LLC, Provo, UT (US)

( * ) Notice: Subject to any disclaimer, the term of this patent is extended or adjusted under 35 U.S.C. 154(b) by 412 days.

(21) Appl. No.: 17/374,603

(22) Filed: Jul. 13, 2021

(65) Prior Publication Data

US 2023/0021249 A1     Jan. 19, 2023

(51) Int. Cl.
　*G06Q 30/02*　　　　(2023.01)
　*G06Q 10/06*　　　　(2023.01)
　*G06Q 10/0639*　　　(2023.01)
　*G06Q 30/0203*　　　(2023.01)

(52) U.S. Cl.
　CPC ...　*G06Q 30/0203* (2013.01); *G06Q 10/06398* (2013.01)

(58) Field of Classification Search
　None
　See application file for complete search history.

(56) References Cited

U.S. PATENT DOCUMENTS

| | | | | |
|---|---|---|---|---|
| 2010/0262462 A1* | 10/2010 | Tryfon | ............... | G06Q 30/0203 |
| | | | | 715/810 |
| 2013/0290005 A1* | 10/2013 | Vesto | ..................... | G16H 50/50 |
| | | | | 705/2 |
| 2014/0324541 A1* | 10/2014 | Malik | ................ | G06Q 30/0203 |
| | | | | 705/7.32 |
| 2017/0286389 A1* | 10/2017 | Ceneviva | .............. | G06F 40/106 |
| 2019/0065017 A1* | 2/2019 | Keller | ...................... | G09B 5/02 |
| 2021/0182996 A1* | 6/2021 | Cella | ..................... | G06N 3/047 |
| 2022/0012096 A1* | 1/2022 | Chaudhary | ........... | G06F 9/5027 |

\* cited by examiner

*Primary Examiner* — Beth V Boswell
*Assistant Examiner* — Ashley Y Young
(74) *Attorney, Agent, or Firm* — Keller Preece PLLC

(57) ABSTRACT

The present disclosure relates to guided solution for collecting basic information from a user to automatically create complex surveys and customer management tools. For example, in one or more embodiments, the disclosed systems provide a series of guided prompts to a user. The disclosed systems receive user answers to the prompts that include data regarding focus subject data (e.g., product information) and desired performance indicators (e.g., Key Performance
Indicators). Based on the user responses, the disclosed systems automatically build fully templatized surveys. Additionally, the disclosed systems also build additional resources including dashboards for managing and reporting survey results and actions.

20 Claims, 21 Drawing Sheets

200

400

500

1200

1210

Accessing A Configuration File

1220

Providing A Guided Resource User Interface

1230

Determining Focus Subject Data And Performance Indicators

1240

Generating A Resource Definition File

1400

DYNAMICALLY GENERATING PLATFORM RESOURCES BY GUIDING USER RESPONSES

BACKGROUND

Recent advancements in computing devices and networking technology have led to a variety of innovations in composing and creating digital resources for gathering, organizing, and displaying information. For example, conventional survey management systems can enable individuals to compile a digital survey, distribute the digital survey to respondents, and manage responses. Indeed, many conventional survey management systems provide tools, libraries, interfaces, and other options to assist individuals in creating digital surveys and managing data from responses.

Despite these and other advances, however, conventional survey management systems continue to suffer from a number of limitations in relation to efficiency and functionality. To illustrate, the tools provided by many conventional survey management systems often face shortcomings relative to efficiency. More specifically, although many conventional survey management systems enable individuals to build various types of surveys via survey building tools, they are often inefficient. In particular, many conventional survey creation systems require complex user interactions with graphical interfaces to navigate and find desired elements for survey creation and management. Thus, conventional survey management systems often rely on voluminous user inputs to create and analyze surveys. For instance, many survey management systems require users to manually input desired questions and modify survey logic flow. Furthermore, conventional systems often require additional user input to customize response reporting mechanisms as well as additional actions required in the administration and management of the survey. Additionally, in instances where a user creates and manages several surveys, conventional survey management systems often require the user to navigate through multiple pages in order to view and manage results of multiple surveys.

Furthermore, conventional survey management systems are often inefficient with respect to computing and storage resources. In particular, conventional systems typically waste substantial computing resources in creating and managing digital surveys, especially complex surveys. Due, in part, to the excessive amount of user input required to create and manage digital surveys, conventional survey management systems expend computing resources to receive and process user inputs in creating and customizing surveys and management tools. For example, in order to create surveys for a sophisticated entity operating in various regions, conventional systems will often require several user inputs to customize surveys specific to each region. Additionally, conventional survey management systems often fail to identify a platform resource as flawed or unproductive until after the platform resource has been created and utilized. Thus, conventional survey management systems are often inefficient with respect to computing and storage resources.

Additionally, conventional survey building tools often fail to create or optimize functional surveys and corresponding tools. In particular, because many conventional systems rely on user input to dictate survey logic flow and response management, conventional systems often fail to create or optimize functional survey data. Conventional survey management systems often create surveys that result in inaccurate and effectively useless responses, for instance, by utilizing an illogical or confusing flow of questions. Furthermore, even in cases where conventional systems create logical surveys, conventional systems often fail to report survey data in a functional manner. In particular, conventional survey management systems frequently rely on users to define and manage survey reporting tools. Thus, conventional systems often provide partially relevant or irrelevant survey data while also failing to report useful response data.

These along with additional problems and issues exist with regard to conventional survey management systems.

SUMMARY

Embodiments of the present disclosure provide benefits and/or solve one or more of the foregoing or other problems in the art with systems, computer media, and methods for improving survey creation and response management by providing a guided solution for collecting basic information from a user to automatically create complex surveys and survey management tools. For example, in one or more embodiments, the disclosed systems provide a series of guided prompts to a user. The disclosed systems receive user answers to the prompts that include data regarding focus subject data (e.g., product information) and desired performance indicators (e.g., Key Performance Indicators). Based on the user responses, the disclosed systems automatically build fully templatized surveys. Additionally, the disclosed systems also build additional resources including dashboards for managing and reporting survey results and actions.

To illustrate, the disclosed systems can access a configuration file comprising potential resource items. The disclosed systems further provide, for display via a client device associated with a user, a guided resource user interface. Based on user responses received via the guided resource generation user interface, the disclosed systems determine focus subject data and performance indicators. The disclosed systems further generate a resource definition file by filtering the configuration file based on the user responses.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description refers to the drawings briefly described below.

DETAILED DESCRIPTION

Figure 1:
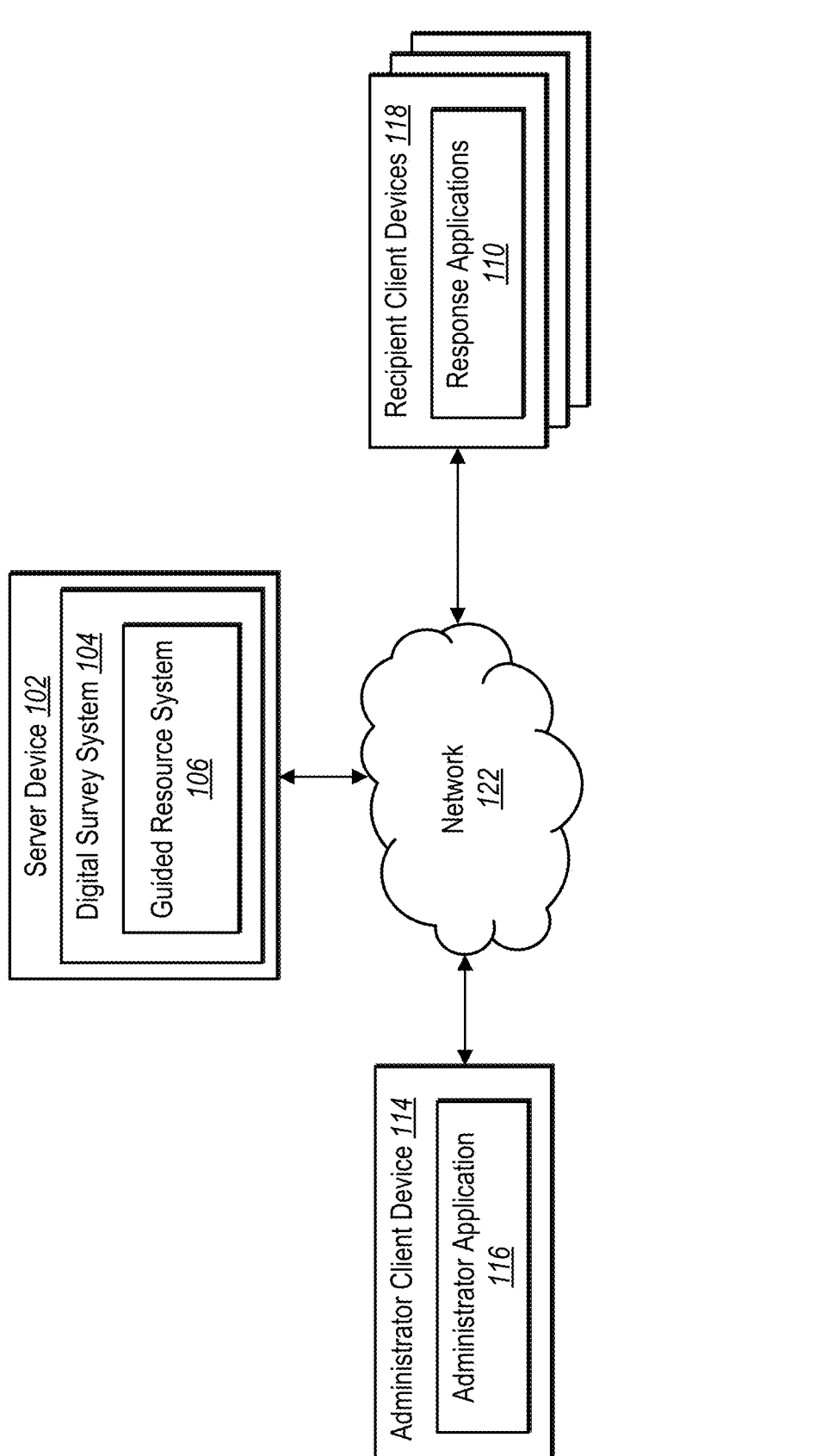
FIG. 1 illustrates a block diagram of an environment in which a guided resource system can operate in accordance with one or more embodiments.

This disclosure describes one or more embodiments of a guided resource system that automatically builds platform resources including surveys, dashboards, and actions based on user interaction with a guided resource user interface. In particular, the guided resource system provides a series of guided prompts to a user via the guided resource user interface. The guided resource system maps user responses to those prompts to different platform resources to automatically generate the platform resources instead of requiring users to manually create individual resources. For example, the guided resource system collects user responses indicating focus subject data as well as desired performance indicators. The guided resource system then utilizes orchestration tools to create the framework for fully integrated platform resources.

To illustrate, the guided resource system accesses a configuration file comprising potential resource items. The guided resource system further provides a guided resource user interface for display via a client device associated with a user. Based on user responses received via the guided resource generation user interface, the guided resource system determines focus subject data and performance indicators. The guided resource system uses the determined user responses to generate a resource definition file by filtering the configuration file.

As mentioned above, the guided resource system accesses a configuration file that includes potential resource items. In some embodiments, the guided resource system determines the type and objective of platform resources to generate. For example, the guided resource system can determine a type of platform resource such as a digital survey, a management dashboard for providing an analysis of survey response data, action items to accompany the digital survey, and others as described further below. Additionally, the guided resource system can determine an objective for the one or more platform resources. For instance, the guided resource system can determine whether a user would like to measure the performance of a product, measure customer confidence or satisfaction, gauge employee satisfaction, etc. The guided resource system selects one or more configuration files with potential resource items based on the determined type and objective of platform resources.

Additionally, the guided resource system accesses a configuration file comprising potential resource items. Generally, resource items are associated with resource elements within a platform resource. For instance, resource items can be associated with survey prompts within a digital survey, action items within a set of action items, widgets in a management dashboard, or others, discussed in detail below. In some embodiments, the guided resource system accesses a configuration file that contains resource items associated with all possible resource elements for a particular platform resource.

The guided resource system provides a guided resource user interface for display via a client device associated with a user. In particular, the guided resource system provides a guided series of prompts. The guided resource system collects user responses to the prompts that indicate at least one of focus subject data and/or performance indicators. Additionally, in some embodiments, the guided resource system further customizes the guided resource user interface based on initial user responses. For example, based on analyzing an initial user response, the guided resource system generates and presents predicted responses for the same prompt or other prompts. Furthermore, the guided resource system may also customize the additional prompts presented to the user based on received responses.

Furthermore, the guided resource system can determine focus subject data and performance indicators based on user responses received via the guided resource user interface. For instance, the guided resource system collects all user responses to the one or more prompts. In particular, the guided resource system collects selected predicted responses as well as responses to additional prompts. Additionally, the guided resource system may retrieve external data as part of determining focus subject data and performance indicators. More specifically, the guided resource system can upload external data provided by the user, conduct an independent search to identify relevant external data, or access historical data to determine focus subject data and performance indicators.

The guided resource system collects and analyzes user responses to generate a resource definition file. In some embodiments, the guided resource system generates the resource definition file by paring down the accessed configuration file. For example, the guided resource system maps user responses to resource items of the potential resource items. The guided resource system thus filters resource items from the configuration file to include in the resource definition file based on user responses.

The guided resource system provides many advantages and benefits over conventional systems and methods. For example, the guided resource system makes improvements to efficiency relative to conventional systems. In particular, the guided resource system significantly reduces the number of actions required by many conventional systems to generate a survey and associated platform resources. For instance, instead of requiring users to manually select questions for surveys, widgets for management dashboards, individual alerts and other action items, etc., the guided resource system provides a single series of prompts via a guided resource generation user interface. The guided resource system automatically generates several integrated platform resources based on user interaction with the guided resource generation user interface. Indeed, the guided resource system greatly simplifies the process and minimizes the required amount of user input. Thus the guided resource generation user interface reduces the number of user steps significantly compared to conventional systems.

Additionally, the guided resource system more efficiently utilizes computing and storage resources relative to conventional systems. In particular, the guided resource system reduces the amount of user input required to customize even complex platform resources. In particular, the guided resource system generates several coherent platform resources based on user responses received via a single guided resource user interface. The guided resource system may also automatically further customize platform resources for regions based on user responses. For example, a user associated with a sophisticated entity may indicate the entity's presence in several regions. The guided resource system then selects and includes resource items that are mapped to the indicated regions. Furthermore, the guided resource system may also access external or third-party data to aid in the efficient generation of accurate platform resources.

The guided resource system can also improve the functionality and accuracy of digital survey systems. In contrast to conventional systems that typically rely on user input to create platform resources, the guided resource system can automatically generate accurate and functional platform resources. In particular, the guided resource system utilizes user responses to filter configuration files to generate resource definition files with optimized resource items. Furthermore, the guided resource system can use user responses from a single series of prompts to create several cohesive resource definition files. Thus, rather than relying on flawed user input to create and coordinate resource items between several platform resources, the guided resource system automatically creates functional and optimized platform resources that work seamlessly with each other.

As is apparent by the foregoing discussion, the present disclosure utilizes a variety of terms to describe features and advantages of the guided resource system. Additional detail is now provided regarding these and other terms used herein. For example, as used herein, the term "configuration file" refers to a file used to configure parameters for a user, program, computer, application, or file. In particular, a configuration file includes data used to build and customize platform resources. For instance, in some embodiments, a configuration file may be used to define parameters of a digital survey, distribution parameters, a management dashboard, action items, and other platform resources. More specifically, a configuration file includes potential resource items that can be included within a platform resource.

As used herein, the term "resource item" refers to an item that is part of a configuration file or a resource definition file. In particular, a resource item refers to an identifiable unit within a configuration or resource definition file that defines a resource element of a platform resource. For example, a resource item can define parameters of various types of resource elements as described below. Furthermore, resource items can include relationships between individual resource items. For instance, a resource item may include a defined order of resource elements within a platform resource.

As mentioned, a resource item of a configuration file or resource definition file defines a resource element within a platform resource. Generally, the term "resource element" refers to a unit within a platform resource. In particular, a resource element comprises an aspect or part of a platform resource. For instance, a resource element can comprise a survey prompt in a digital survey, a widget within a management dashboard, an alert within a set of action items, or a distribution group or other parameter within a set of distribution parameters.

As used herein, the term "guided resource user interface" refers to a graphical user interface for creating a platform resource. In particular, a guided resource user interface refers to the interface by which the guided resource system provides a guided series of prompts and receives user responses to customize resource definition files. For example, a guided resource user interface can comprise one or more user interfaces including various prompts.

As used herein, the term "user response" refers to electronic data provided in response to a prompt. The term "user response" refers to electronic data including content and/or feedback based on user input from a user in reply to one or more prompts presented via the guided resource user interface. For example, the term "user response" can include answers or responses to one or more prompts indicating focus subject data or performance indicators.

As used herein, the term "focus subject data" refers to information relating to a focus subject. In particular, focus subject data reflects information about the focus subject of a platform resource. Focus subject data can include identifying data of a person, group of people, an entity, brand, or experience that is the subject of a platform resource. For instance, for a digital survey focus subject data can include an industry identifier, distractor industry names, brand names, competitor brand names, etc.

As used herein, the term "performance indicator" refers to a type of performance measurement. In particular, a performance indicator can include a value or set of values for measuring the performance of an organization or an activity. For instance, performance indicators can include quantitative indicators (e.g., time to market, average sales, etc.), qualitative indicators (e.g., company awareness, brand affinity, etc.), and various other types of indicators used to measure the performance of a focus subject.

As used herein, the term "resource definition file" refers to a file including data that defines a platform resource. In particular, a resource definition file includes data that uniquely identifies a platform resource. A resource definition file includes resource items that dictate which resource elements to include within a platform resource. For example, a resource definition file can comprise a pared down or filtered configuration file. The guided resource system can provide a resource definition file to an orchestration engine to build a platform resource.

As used herein, the term "platform resource" refers to a tool or resource available on a digital platform. In particular, a platform resource includes an instrument used to access the functionality of a digital platform. A platform resource can include a digital survey, distribution parameters, a management dashboard, action items, and other tools available via a computing platform as described herein.

Additional detail will now be provided regarding the guided resource system in relation to illustrative figures portraying example embodiments. For example, FIG. 1 illustrates a schematic diagram of an environment 100 in which a guided resource system 106 operates in accordance with one or more embodiments. As illustrated, environment 100 includes a server device 102 and client devices (i.e., an administrator client device 114 and recipient client devices 118) connected by a network 122. Additional details regarding the various computing devices (e.g., the server device 102, the administrator client device 114, the recipient client devices 118, and the network 122) are explained below with respect to FIGS. 13 and 14.

As shown, the server device 102 hosts a digital survey system 104 and the guided resource system 106. In general, the digital survey system 104 facilitates the creation, administration, and analysis of various platform resources including digital surveys. In particular, the digital survey system 104 facilitates the creation and management of platform resources including digital surveys, distribution parameters, management dashboards, and sets of actions. For example, the digital survey system 104 enables a user (e.g., an administrative user) via the administrator client device 114, to create, modify, and run a digital survey that includes various questions (e.g. electronic survey questions). In addition, the digital survey system 104 provides survey questions to recipients, and collects responses from respondents (i.e., responding recipients/users) via the recipient client devices 118. Furthermore, the digital survey system 104 generates management dashboards for displaying compiled response data as well as sets of actions regarding the digital surveys.

In addition, the digital survey system 104 includes the guided resource system 106. In various embodiments, the guided resource system 106 generates resource definition files based on user input received via a guided resource user interface. More particularly, the guided resource system 106 accesses a configuration file comprising potential resource items. The guided resource system 106 further pares down the configuration file to become a final resource definition file based on user interaction with a guided resource generation user interface. More specifically, the guided resource system 106 creates and provides, for display via the administrator client device 114, a guided resource user interface that includes various prompts for determining focus subject data and performance indicators. The guided resource system 106 analyzes user responses received from the administrator client device 114 to filter the configuration file and generate the resource definition file.

As illustrated in FIG. 1, the environment 100 includes the administrator client device 114. The administrator client device 114 includes an administrator application 116 that enables a user (e.g., an administrator) to access the digital survey system 104 and/or the guided resource system 106. For example, the guided resource system 106 provides the guided resource user interface using the administrator application 116. In particular, the guided resource system 106 creates and modifies platform resources based on signals received from the administrator application 116. Furthermore, the guided resource system 106 provides various platform resources for display at the administrator client device 114 via the administrator application 116. For instance, the guided resource system 106 provides management dashboards for display via the administrator client device 114. Additionally, the guided resource system 106 can send alerts and other actions from a set of actions to the administrator application 116. In some embodiments, the administrator application 116 comprises a web application (e.g., a web browser) or a native application (e.g., a mobile application, a desktop application, etc.) on the administrator client device 114.

The environment 100 also includes the recipient client devices 118. As illustrated in FIG. 1, the recipient client devices 118 includes the response applications 110. In one or more embodiments, the digital survey system 104 distributes digital surveys to the recipient client devices 118 via the response applications 110. Furthermore, the guided resource system 106 receives survey responses via the response applications 110. In some embodiments, the response applications 110 comprise web applications (e.g., web browsers) or native applications (e.g., mobile applications, desktop applications, etc.) on the recipient client devices 118.

Although FIG. 1 illustrates a particular number of computing devices, the environment 100 can include any number of devices, including any number of server devices and/or client devices. In addition, while the environment 100 shows one arrangement of computing devices, various arrangements and configurations are possible. For example, in some embodiments, the administrator client device 114 may directly communicate with the server device 102 via an alternative communication network, bypassing the network 122.

In various embodiments, the guided resource system 106 can be implemented on multiple computing devices. In particular, and as described above, the guided resource system 106 may be implemented in whole by the server device 102, or the guided resource system 106 may be implemented in whole by the administrator client device 114. Alternatively, the guided resource system 106 may be implemented across multiple devices or components (e.g., utilizing the server device 102 and the administrator client device 114).

To elaborate, in various embodiments, the server device 102 can also include all, or a portion of, guided resource system 106, such as within the digital survey system 104. For instance, when located on the server device 102, the guided resource system 106 includes an application running on the server device 102 or a portion of a software application that can be downloaded to the administrator client device 114 (e.g., the administrator application 116). For example, the guided resource system 106 includes a networking application that allows an administrator client device 114 to interact (e.g., submit user responses) via the network 122 and access platform resources created by the guided resource system 106.

The components 102-118 can include software, hardware, or both. For example, the components 102-118 include one or more instructions stored on a non-transitory computer-readable storage medium and executable by processors of one or more computing devices, such as a client device or a server device. When executed by the one or more processors, the computer-executable instructions of the server device 102 and/or the administrator client device 114 can cause the computing device(s) to perform the feature learning methods described herein. Alternatively, the components 102-118 can include hardware such as a special-purpose processing device to perform a certain function or group of functions. Alternatively, the components 102-118 can include a combination of computer-executable instructions and hardware.

Furthermore, the components 102-118 are, for example, implemented as one or more operating systems, as one or more stand-alone applications, as one or more modules of an application, as one or more plug-ins, as one or more library functions or functions called by other applications and/or as a cloud computing model. Thus, the components 102-118 can be implemented as a stand-alone application, such as a desktop or mobile application. Furthermore, the components 102-118 can be implemented as one or more web-based applications hosted on a remote server. The components 102-118 can also be implemented in a suite of mobile device applications or "apps."

Figure 2:
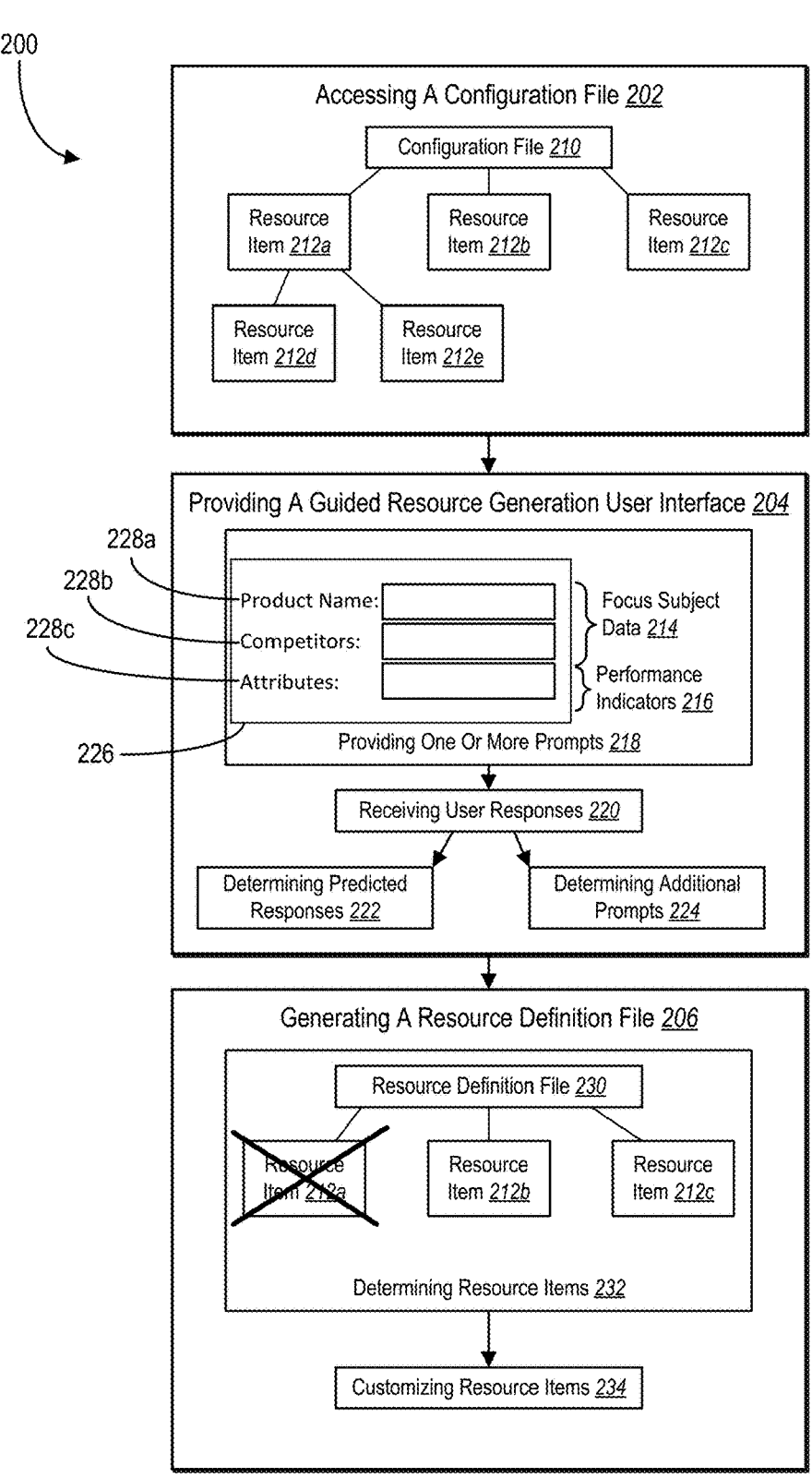
FIG. 2 illustrates an overview of a series of acts for generating a resource definition in accordance with one or more embodiments.

As mentioned, the guided resource system 106 provides a guided resource user interface to a user to automatically generate fully integrated platform resources. The following figures provide additional detail regarding the guided resource system 106 generating platform resources based on user interaction with the guided resource user interface. In particular, FIG. 2 illustrates a series of acts 200 for generating a resource definition file for a platform resource in accordance with one or more embodiments. As illustrated, the series of acts 200 includes an act 202 of accessing a configuration file, an act 204 of providing a guided resource generation user interface, and an act 206 of generating a resource definition file.

As illustrated in FIG. 2, the series of acts 200 includes the act 202 of accessing a configuration file. In particular, the guided resource system 106 identifies a configuration file and accesses the identified configuration file. As mentioned, a configuration file is associated with a platform resource. The guided resource system 106 may determine to access particular configuration files and not others. In some embodiments, the guided resource system 106 determines to access a configuration file based on user input. In one example, the guided resource system 106 receives user input indicating particular platform resources that the user would like to utilize. The guided resource system 106 accesses configuration files corresponding to the indicated particular platform resources. For instance, based on detecting user selection of a digital survey and a management dashboard, the guided resource system 106 accesses configuration files for a digital survey and a management dashboard. Additionally, or alternatively, the guided resource system 106 can automatically determine which configuration files to access based on providing a series of opening prompts. For instance, based on receiving opening responses indicating that a user would like to monitor employee satisfaction, the guided resource system 106 automatically accesses configuration files corresponding to a digital survey, management dashboards, and action items.

Furthermore, in some embodiments, the guided resource system 106 determines an objective for corresponding platform resources as part of the act 202 of accessing the configuration file. Generally, the guided resource system 106 determines both the type of desired platform resources (e.g., management dashboard, action items, etc.) and an objective of the one or more platform resources. In particular, a platform resource objective indicates a goal or purpose of the platform resources. For example, a platform resource objective might include determining customer satisfaction, measuring product performance, evaluating employee productivity, etc. In some embodiments, the guided resource system 106 determines the objective for the platform resources based on user input. For instance, in some embodiments, the guided resource system 106 provides, for display via a user client device, an objective user interface providing various platform resources and objectives. In other embodiments, the guided resource system 106 provides a series of objective prompts to the user. Based on receiving and analyzing objective responses, the guided resource system 106 determines an objective.

As illustrated in FIG. 2, the guided resource system 106 performs the act 202 by accessing a configuration file 210 that includes resource items 212a-212e. As mentioned previously, the guided resource system 106 accesses a configuration file comprising potential resource items. In some embodiments, the resource items 212a-212e comprise potential resource items to be included within the final resource definition file. In one example, the configuration file 210 corresponds to a digital survey platform resource comprising the resource items 212a-212e that comprise all possible questions in the digital survey. In one or more embodiments, the guided resource system 106 maps specific configuration files containing particular resource items to objectives.

As further illustrated in FIG. 2, the guided resource system 106 performs the act 204 of providing a guided resource generation user interface. As illustrated in FIG. 2, the act 204 further comprises an act 218 of providing one or more prompts, an act 220 of receiving user responses, an act 222 of determining predicted responses, and an act 224 of determining additional prompts. Generally, the guided resource system 106 provides the guided resource generation user interface for display via a user client device (e.g., the administrator client device 114 of FIG. 1). The guided resource system 106 utilizes the guided resource generation user interface to provide prompts as well as receive user responses to customize the resource definition file.

As mentioned, as part of performing the act 204 of providing the guided resource generation user interface, the guided resource system 106 performs the act 218 of providing one or more prompts. In particular, the guided resource system 106 provides a guided resource generation user interface 226 that includes prompts 228a-228c. As illustrated in FIG. 2, the prompts 228a-228c are directed toward collecting different types of user responses. In particular, the guided resource system 106 utilizes the prompts 228a-228c to collect user responses indicating focus subject data 214 and performance indicators 216. For example, the prompts 228a-228b are directed toward collecting user responses relating to the focus subject data 214. The prompt 228c is directed toward collecting user responses indicating the performance indicators 216 that the user would like to measure or view.

In one or more embodiments, guided resource system 106 selects the one or more prompts based on the determined objective of the platform resources. More specifically, and as mentioned previously, the guided resource system 106 maps configuration files to specific objectives. The guided resource system 106 identifies one or more prompts to effectively filter the resource items in the configuration files. Thus, the guided resource system 106 selects a series of prompts specific for each platform resource type and objective.

As further illustrated in FIG. 2, the guided resource system 106 performs the act 220 of receiving user responses. Generally, the guided resource system 106 receives user responses to the prompts 228a-228c provided via the guided resource generation user interface 226. For instance, the guided resource system 106 receives and analyzes user input to the prompts 228a-228c. As will be detailed further below, the guided resource system 106 utilizes initial user responses to further customize the resource generation user interface 226. Thus, in some embodiments, the act 220 comprises receiving initial user responses.

Figure 4:
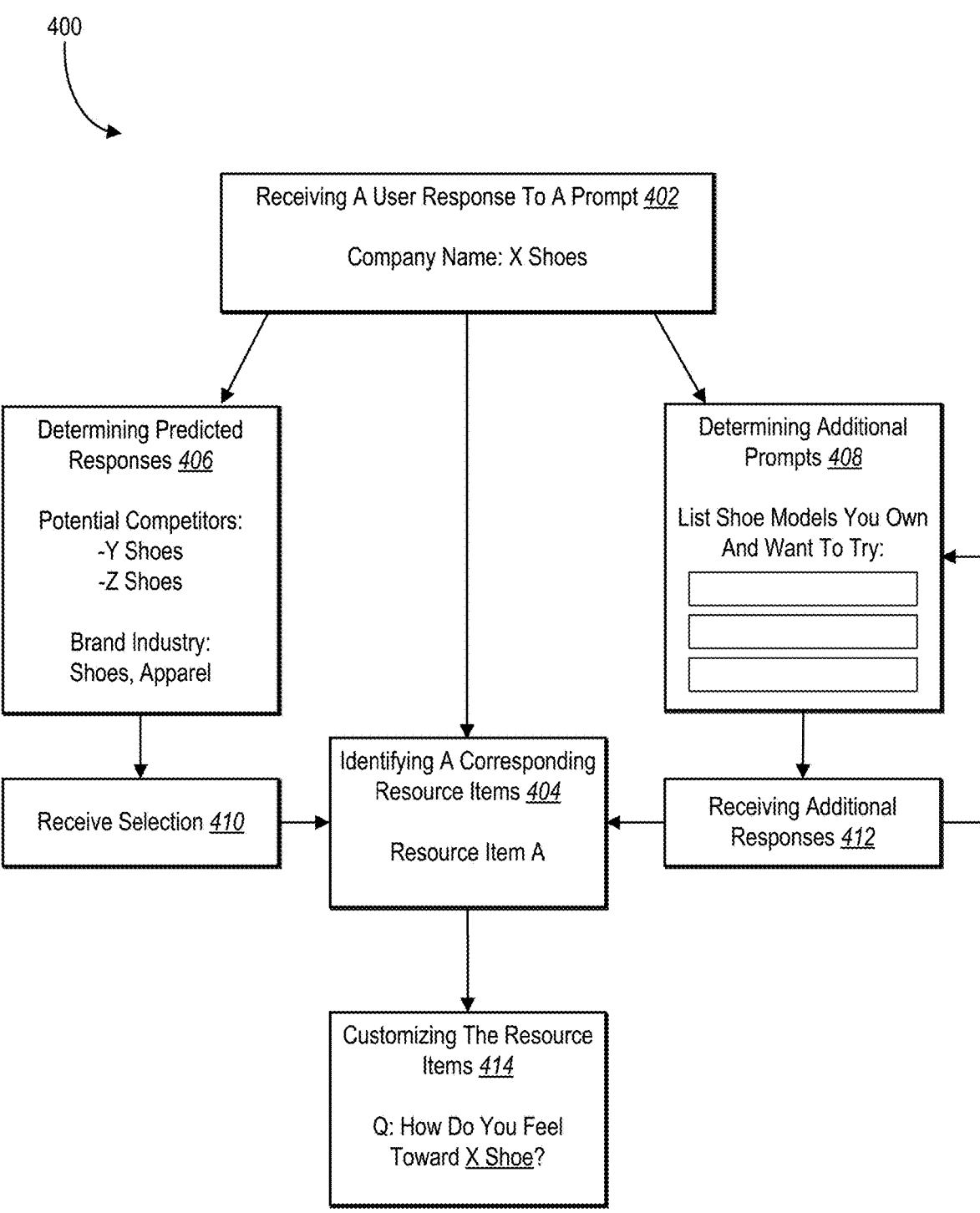
FIG. 4 illustrates an example series of acts for identifying corresponding resource items and customizing the resource items in accordance with one or more embodiments.
Figure 5:
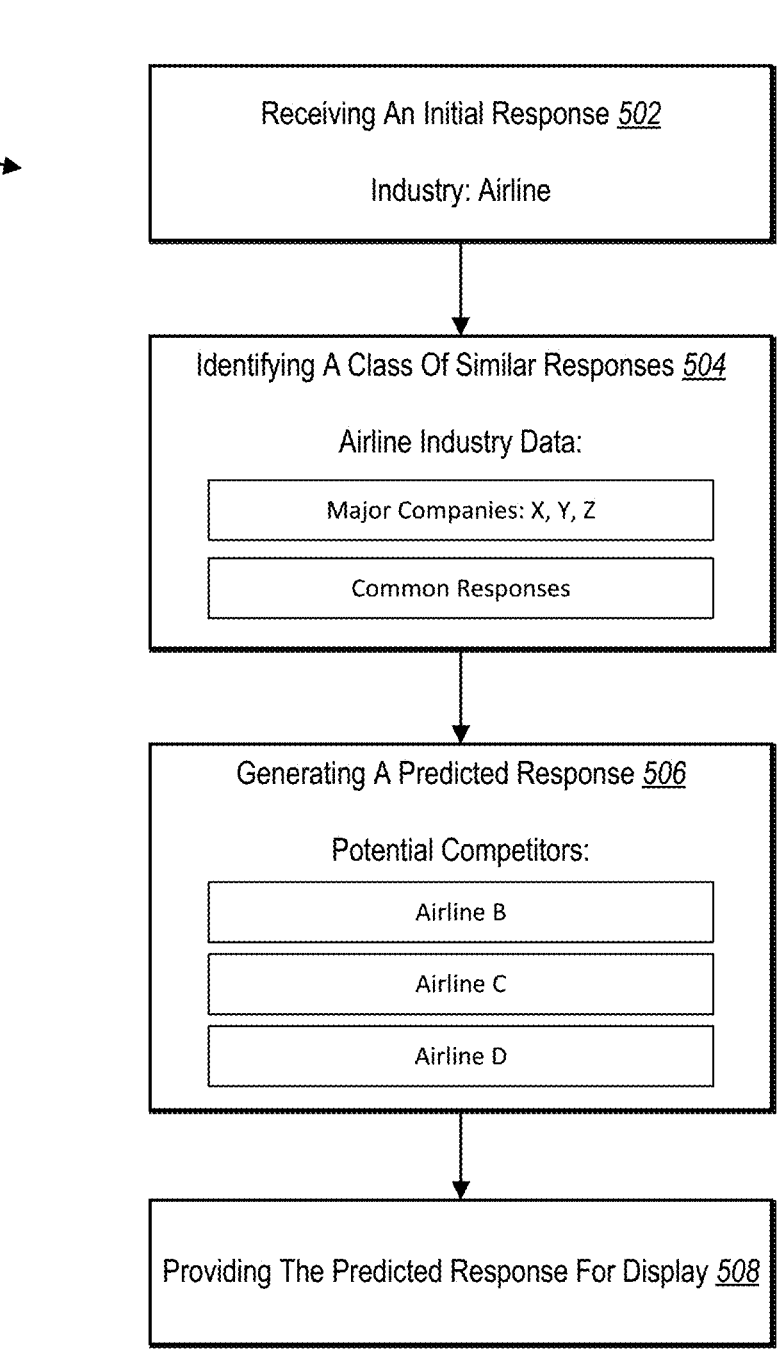
FIG. 5 illustrates a series of acts for providing a predicted response for display in accordance with one or more embodiments.

As illustrated in FIG. 2, the guided resource system 106 further customizes the guided resource generation user interface 226 based on the initial user responses. Generally, the guided resource system 106 customizes the resource generation user interface 226 by performing the act 222 of determining predicted responses and the act 224 of determining additional prompts. In particular, as part of performing the act 222 of determining predicted responses, the guided resource system 106 analyzes maps initial user responses to predicted responses. The guided resource system 106 can generate predicted responses for the same prompt or for additional prompts. For instance, based on receiving an initial response to the prompt 228a that a product name is "Shoe X," the guided resource system 106 may determine predicted responses for the prompt 228a by predicting other products (e.g., Shoe Y) that might be of interest to the user. Additionally, the guided resource system 106 may generate predicted responses for the prompts 228b-228c. The guided resource system 106 may further receive a selection of a predicted response. FIGS. 4-5 and the corresponding discussion provide additional detail regarding the guided resource system 106 generating predicted responses in accordance with one or more embodiments.

As further illustrated in FIG. 2, the guided resource system 106 performs the act 224 of determining additional prompts. In particular, based on the responses to one or more of the prompts 228a-228c, the guided resource system 106 can determine to provide additional prompts. Similar to how the guided resource system 106 generates predicted responses, the guided resource system 106 maps additional prompts to initial user responses. The guided resource system 106 receives additional user responses to the additional prompts. FIG. 4 and the corresponding paragraphs provide additional detail regarding how the guided resource system 106 generates additional prompts in accordance with one or more embodiments.

As further illustrated in FIG. 2, the guided resource system 106 performs the act 206 of generating a resource definition file. Generally, the guided resource system 106 performs the act 206 by performing an act 232 of determining resource items and an act 234 of customizing resource items. Generally, as part of performing the act 232 of determining resource items, the guided resource system 106 pares down some of the resource items 212a-212e based on the user responses. As illustrated, the guided resource system 106 filters the configuration file 210 to generate a resource definition file 230 by removing the resource item 212a and the associated resource items 212d-212e. Thus, the resource definition file 230 comprises the resource items 212b-212c.

As further illustrated in FIG. 2, as part of performing the act 206 of generating the resource definition file, the guided resource system 106 performs the act 234 of customizing resource items. In particular, based on determining to include the resource items 212b-212c within the resource definition file 230, the guided resource system 106 customizes the resource items 212b and 212c based on the user responses. For instance, if the resource definition file 230 defines the parameters of a digital survey, the guided resource system 106 automatically customizes survey prompts (i.e., the resource items 212b-212c) to include the product name based on the user response to the prompt 228a or the attributes associated with the prompt 228c.

Furthermore, in some embodiments, the series of acts 200 includes an additional act of modifying the resource definition file. Generally, the guided resource system 106 further modifies the resource definition file by reorganizing, adding, or removing resource items or customizing individual resource items. In some embodiments, the guided resource system 106 modifies the resource definition file based on user input. For example, in one or more embodiments, the guided resource system 106 provides options to the user to preview and also modify the resource definition file (or the platform resource). In particular, the guided resource system 106 provides an intuitive user interface by which the user may input modifications such as reorganizing, adding, removing, or customizing resource items within the resource definition file.

Figure 3:
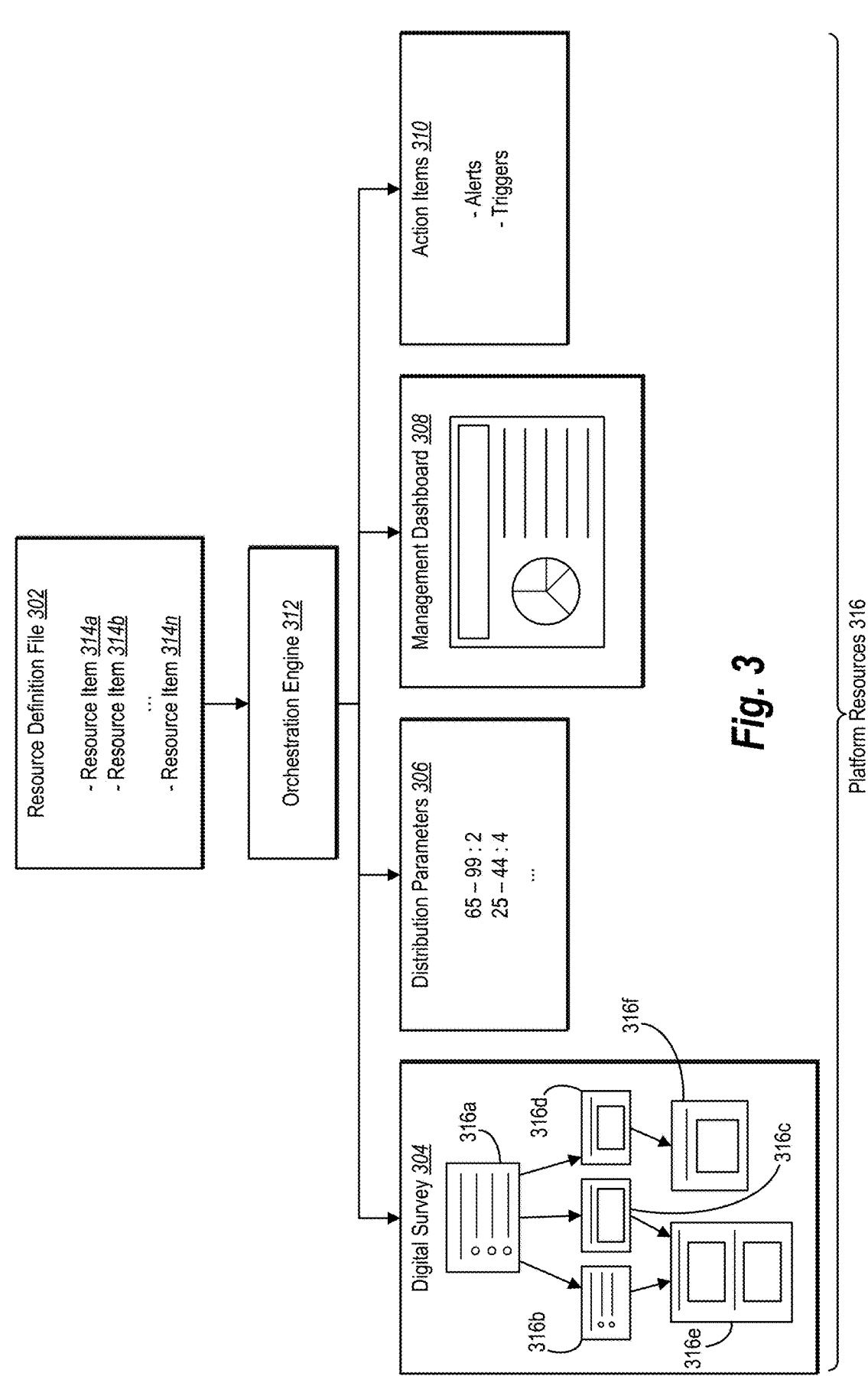
FIG. 3 illustrates an overview of example platform resources in accordance with one or more embodiments.

FIG. 2 provides an overview of the guided resource system 106 customizing a resource definition file in accordance with one or more embodiments. FIG. 3 illustrates example platform resources 316 that the guided resource system 106 generates utilizing an orchestration engine in accordance with one or more embodiments. In particular, FIG. 3 illustrates the guided resource system 106 generating the platform resources 316 including a digital survey 304, distribution parameters 306, a management dashboard 308, and action items 310 based on a resource definition file 302. While FIG. 3 illustrates a single resource definition file 302, in one or more embodiments, the guided resource system 106 utilizes platform resource-specific resource definition files to create the platform resources 316. More specifically, the guided resource system 106 utilizes a resource definition file 302 to generate each of the platform resources 316 illustrated in FIG. 3. Additionally, while FIG. 3 illustrates the platform resources 316, the guided resource system 106 may generate several additional types of platform resources in one or more embodiments.

As illustrated in FIG. 3, the guided resource system 106 utilizes an orchestration engine 312 to generate the platform resources by utilizing the resource definition file 302. In particular, in some embodiments, the resource definition file 302 comprises a template file including the resource items 314a-314n. The guided resource system 106 utilizes the orchestration engine 312 to manage the mapping of resource elements to the resource items 314a-314n. In particular, the orchestration engine 312 translates the resource definition file 302 into one of the platform resources 316. In some embodiments, the orchestration engine 312 utilizes a templating language to organize the platform resources 316 according to the rules and definitions included within the resource definition file 302.

As mentioned, FIG. 3 illustrates examples of the platform resources 316. In particular, the platform resources 316 include the digital survey 304, the distribution parameters 306, the management dashboard 308, and the action items 310. The following paragraphs describe each of the platform resources 316.

As illustrated, the guided resource system 106 can generate a digital survey 304. Generally, the digital survey 304 refers to an electronic communication to collect information. In particular, the digital survey 304 comprises one or more resource elements in the form of survey prompts. For instance, the digital survey 304 includes a number of different types of survey prompts including multiple choice, matrix, and other types of survey prompts. As further illustrated in FIG. 3, the digital survey 304 is associated with a logic flow. More specifically, the resource definition file 302 defines the logic flow of the digital survey 304. In one embodiment, the logic flow dictates the order in which respondents experience the elements of the digital survey 304. For example, the digital survey system 104 determines to present the survey prompt 316b, 316c, or 316d to a respondent based on receiving different survey responses to the survey prompt 316a. The logic flow of the digital survey 304 dictates presenting the survey prompt 316f to users who also received the survey prompt 316d while presenting the survey prompt 316e to users who viewed survey prompts 316b and 316c.

As further illustrated in FIG. 3, the guided resource system 106 generates the distribution parameters 306 by utilizing the orchestration engine 312. More specifically, the guided resource system 106 utilizes the resource definition file 302 to dictate the distribution parameters 306. Generally, the distribution parameters 306 comprise one or more resource elements in the form of parameters that dictate the distribution of a digital survey. In particular, the distribution parameters 306 define the means and timing of distribution as well as the size and demographic makeup of the respondent population. For instance, the distribution parameters 306 can dictate whether to distribute a digital survey using text messaging, email, etc. The distribution parameters 306 also dictate the timing of sending a digital survey as well as follow ups. Additionally, the distribution parameters 306 include parameters for demographic makeup and size of the respondent population. For example, and as illustrated, the distribution parameters 306 include a quota of 2 respondents between the ages 65 and 99 and 4 respondents between the ages 25 and 44.

As further illustrated in FIG. 3, the guided resource system 106 also generates the management dashboard 308 by utilizing the orchestration engine 312. Generally, the management dashboard 308 reports and enables the management of data. In particular, the management dashboard 308 presents data relevant to a platform resource. For instance, the management dashboard 308 includes data reflecting respondent responses to a digital survey. The management dashboard 308 can comprise multiple pages which, in turn, are made up of resource elements in the form of widgets that visualize data.

As illustrated in FIG. 3, the platform resources 316 include the action items 310. Generally, action items comprise tasks. In particular, action items comprise tasks and one or more triggers based on various events. For example, an action item can have a scheduled trigger by which the action item is executed based on a predetermined time (e.g., every Monday at 8:00 am). Additionally, action items may be tied to specific even triggers. For instance, an action item may be triggered based on a digital survey response being collected, a performance indicator falling below a threshold value, an event meeting a certain condition or conditions, etc. Example action items might include tasks such as automatically sending an email task to a manager, creating a ticket for a support rep, resending a digital survey, and other tasks. Furthermore, and as illustrated, the action item might comprise a task of creating an alert.

In one or more embodiments, the guided resource system 106 generates various other platform resources based on user responses via the guided resource user interface. For example, the guided resource system 106 can create projects that provide a resource user interface that organizes and presents various platform resources in a single graphical user interface. Additionally, the guided resource system 106 can create reports that organize data from digital surveys in intuitive single- or multi-page reports. Furthermore, the guided resource system 106 can generate a library in which all platform resources—related and unrelated ones—may be organized, viewed, and searched. The guided resource system 106 can generate these and other platform resources.

As mentioned previously, the guided resource system 106 receives responses to one or more prompts that are part of the guided resource user interface. As mentioned, the guided resource system 106 customizes resource items based on user responses to prompts. FIG. 4 illustrates a series of acts 400 for customizing resource items based on receiving a response to a prompt. In particular, FIG. 4 illustrates an act 402 of receiving a user response to a prompt, an act 404 of identifying corresponding resource items, an act 406 of determining predicted responses, an act 410 of receiving a selection, an act 408 of determining additional prompts, an act 412 of receiving additional responses, and an act 414 of customizing the resource items.

As illustrated in FIG. 4, the guided resource system 106 performs the act 402 of receiving a user response to a prompt. In particular, the guided resource system 106 receives an initial user response to a prompt via the guided resource user interface. For example, and as illustrated in FIG. 4, the guided resource system 106 receives a user response of "X Shoes" for a prompt asking for a company name. In some embodiments, the guided resource system 106 receives and analyzes the user response in real time as soon as the user enters the response. In other embodiments, the guided resource system 106 receives and analyzes the user responses based on user selection of a submission element.

As further illustrated in FIG. 4, the guided resource system 106 performs the act 406 of determining predicted responses. In particular, the guided resource system 106 analyzes the received user response to generate predicted responses for the same or different prompts. For instance, based on analyzing the initial user response, the guided resource system 106 generates one or more predicted responses. The guided resource system 106 presents the predicted responses to the user via the guided resource user interface. For example, and as illustrated in FIG. 4, based on the user response that the company name is "X Shoes," the guided resource system 106 provides predicted responses "Y Shoes" and "Z Shoes" for the prompt asking for potential competitors. Additionally, the guided resource system 106 may also receive an initial response to a prompt and generate predicted responses for the same prompt. For instance, based on receiving the user response "Y Shoes," the guided resource system 106 can generate the predicted response "Z Shoes." FIG. 5 and the corresponding paragraphs provide additional detail regarding the guided resource system 106 generating predicted responses in accordance with one or more embodiments.

Furthermore, the guided resource system 106 performs the act 410 of receiving a selection. In particular, the guided resource system 106 receives a selection of a predicted response. The guided resource system 106 receives a user selection of the predicted response indicating that the predicted response is correct or a desired response. For instance, as illustrated in FIG. 4, the guided resource system 106 presents the predicted responses "shoes," and "apparel" for the prompt indicating a brand industry. The guided resource system 106 enters the selected predicted response as a user response.

As further illustrated in FIG. 4, the guided resource system 106 performs the act 408 of determining additional prompts. In particular, the guided resource system 106 determines additional prompts that will access relevant information based on the initial user response. For instance, based on determining that the company name is "X Shoes," the guided resource system 106 identifies additional prompts that are related to the shoe industry or the particular company. More specifically, the guided resource system 106 determines that the user may want to test specific shoe models.

As illustrated in FIG. 4, the guided resource system 106 performs the act 412 of receiving additional responses. In particular, the guided resource system 106 receives additional user responses to the additional prompt. The guided resource system 106 designates the additional responses as user responses. Additionally, the guided resource system 106 can identify yet additional prompts based on receiving additional user responses.

Figure 6:
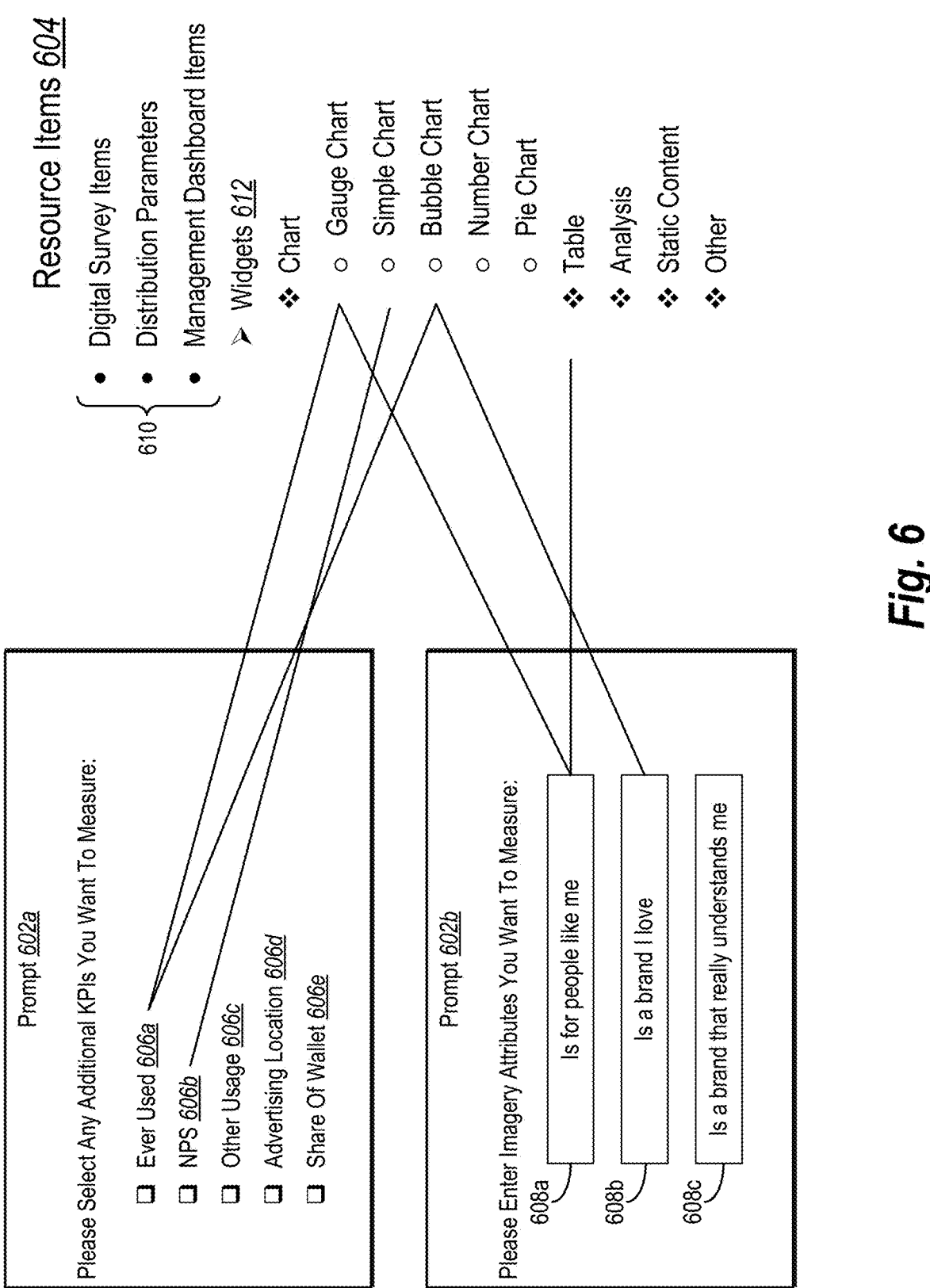
FIG. 6 illustrates an example mapping of user responses to resource items in accordance with one or more embodiments.

The guided resource system 106 also performs the act 404 of identifying corresponding resource items. In particular, the guided resource system 106 maps resource items to particular user responses. In some embodiments, the guided resource system 106 analyzes initial user responses, user selected predicted responses, and additional responses to identify corresponding resource items. The guided resource system 106 determines to include or exclude resource items in a resource definition file based on the received user responses. In one or more embodiments, the guided resource system 106 maps resource items to include and/or resource items to exclude to a particular response. FIG. 6 and the corresponding discussion provide additional detail regarding mapping resource items to a received user response.

Furthermore, and as illustrated in FIG. 4, the guided resource system 106 performs the act 414 of customizing the resource items. In particular, the guided resource system 106 not only selects a resource items for inclusion or exclusion within a resource definition file, the guided resource system 106 also customizes the selected resource items. For example, and as illustrated, the guided resource system 106 customizes the resource item to define a survey prompt (i.e., a resource element) asking "How do you feel toward X Shoe?" Thus, rather than utilizing generic resource elements, the guided resource system 106 customizes the resource elements based on the received user responses. In one or more embodiments, the guided resource system 106 customizes the resource items which define customized resource elements. Additionally, or alternatively, the guided resource system 106 does not customize the resource item but rather directly modifies the resource element within the platform resource.

As mentioned previously, the guided resource system 106 generates predicted responses for prompts based on initial user responses. FIG. 5 illustrates the guided resource system 106 generating predicted responses in accordance with one or more embodiments. In particular, FIG. 5 illustrates a series of acts 500 for providing a predicted response for display. The series of acts 500 includes an act 502 of receiving an initial response, an act 504 of identifying a class of similar responses, an act 506 of generating a predicted response, and an act 508 of providing the predicted response for display.

As illustrated in FIG. 5, the guided resource system 106 performs the act 502 of receiving an initial response. In particular, the guided resource system 106 receives an initial user response to a prompt. For example, the guided resource system 106 receives the initial user response that indicates that the focus industry is the airline industry.

As illustrated in FIG. 5, the guided resource system 106 further performs the act 504 of identifying a class of similar responses. Generally, the guided resource system 106 analyzes the initial response and determines a class of responses associated with the initial response. For example, the guided resource system 106 analyzes the initial response to determine a class of "airline" responses.

As further illustrated in FIG. 5, the guided resource system 106 performs the act 506 of generating a predicted response. In particular, the guided resource system 106 accesses historical data and, in some embodiments, external data based on the determined class of similar responses. More specifically, in some embodiments, the guided resource system 106 accesses historical data to determine common user responses based on the class of similar responses. For instance, the guided resource system 106 accesses historical data to retrieve user responses from other users who entered "airline" to the industry prompt.

Furthermore, and as mentioned previously, the guided resource system 106 may also access external data to generate a predicted response. In particular, the guided resource system 106 can independently access external data or receive external data input by the user. For instance, in some embodiments, the guided resource system 106 retrieves airline industry data to predict responses. In some embodiments, the guided resource system 106 retrieves data based on an independent search. For instance, the guided resource system 106 can conduct an internet search to identify airline companies that may be competitors in the airline industry. Additionally, the guided resource system 106 can also access data uploaded or linked by the user. For instance, the guided resource system 106 may access information previously uploaded by the user. In any case, the guided resource system 106 generates predicted responses based on the retrieved data. For example, and as illustrated, the guided resource system 106 generates the predicted responses "Airline B," "Airline C," and "Airline D" as potential competitors.

As further illustrated in FIG. 5, the guided resource system 106 performs the act 508 of providing the predicted response for display. In particular, the guided resource system 106 provides the predicted responses for display via the guided resource user interface. For example, the guided resource system 106 may populate the same or additional prompts with the predicted responses. As previously mentioned, the guided resource system 106 may further determine selection of the response based on user interaction with the guided resource user interface.

While FIG. 5 illustrates provided predicted responses for display to a user, the guided resource system 106 may perform a series of acts similar to those illustrated in FIG. 5 to generate additional prompts to display to the user. For instance, the guided resource system 106 performs the act 502 of receiving an initial response. The guided resource system 106 further performs the act 504 of identifying a class of similar responses. The guided resource system 106 may also perform an additional act of generating an additional prompt.

To illustrate, the guided resource system 106 may access historical data and external data to identify additional prompts. In one example, the guided resource system 106 accesses information from past users such as customizations that past users made to the platform resources. The guided resource system 106 analyzes common customizations and generates additional prompts to receive user responses that relate to the common customizations. For instance, based on determining that past users often customize platform resources to include resource elements relating to specific airplane models, the guided resource system 106 may generate an additional prompt that asks the user what airplane models the user would like to test. Additionally, the guided resource system 106 may access external data to generate an additional prompt. For instance, the guided resource system 106 may access information input by the user (e.g., company information) or independently identify external data (e.g., industry data) to identify additional prompts.

As mentioned previously, the guided resource system 106 filters the configuration file by mapping user responses to resource items. Generally, the guided resource system 106 utilizes user responses as a sort of filter to pare down resource items within the configuration file to generate the resource definition file. FIG. 6 illustrates an example mapping between user responses and resource items in accordance with one or more embodiments. In particular, FIG. 6 includes a prompt 602a containing user responses 606a-

606*e* and a prompt 602*b* containing user responses 608*a*-608*c*. The user responses are further mapped to resource items 604.

As illustrated in FIG. 6, the guided resource system 106 maps the user responses to various resource items. In particular, the resource items 604 include resource items corresponding to resource elements for inclusion within various platform resources 610. For instance, the guided resource system 106 maps user responses to resource items for digital surveys, distribution parameters, management dashboards, and action items. While FIG. 6 illustrates mappings between the user responses and resource items within a management dashboard (more specifically with widgets 612), the guided resource system 106 generates mappings between the user responses and resource items within any other type of platform resource. Furthermore, in one or more embodiments, the guided resource system 106 can map or tie a single user response to resource items in multiple platform resources. Thus, the guided resource system 106 accesses and includes resource items consistently across platform resources.

As illustrated in FIG. 6, the guided resource system 106 maps the user responses 606*a*-606*e* and the user responses 608*a*-608*c* to one or more of the resource items 604. The resource items 604 illustrated in FIG. 6 include example resource items (i.e., the widgets 612) that may be included within a management dashboard definition file. To illustrate, based on an indication of user selection of the user response 606*a*, the guided resource system 106 determines to include the resource items corresponding to a gauge chart widget and a simple chart within a management dashboard platform resource. FIG. 6 includes additional mappings between user responses and various resource items.

Figure 7A:
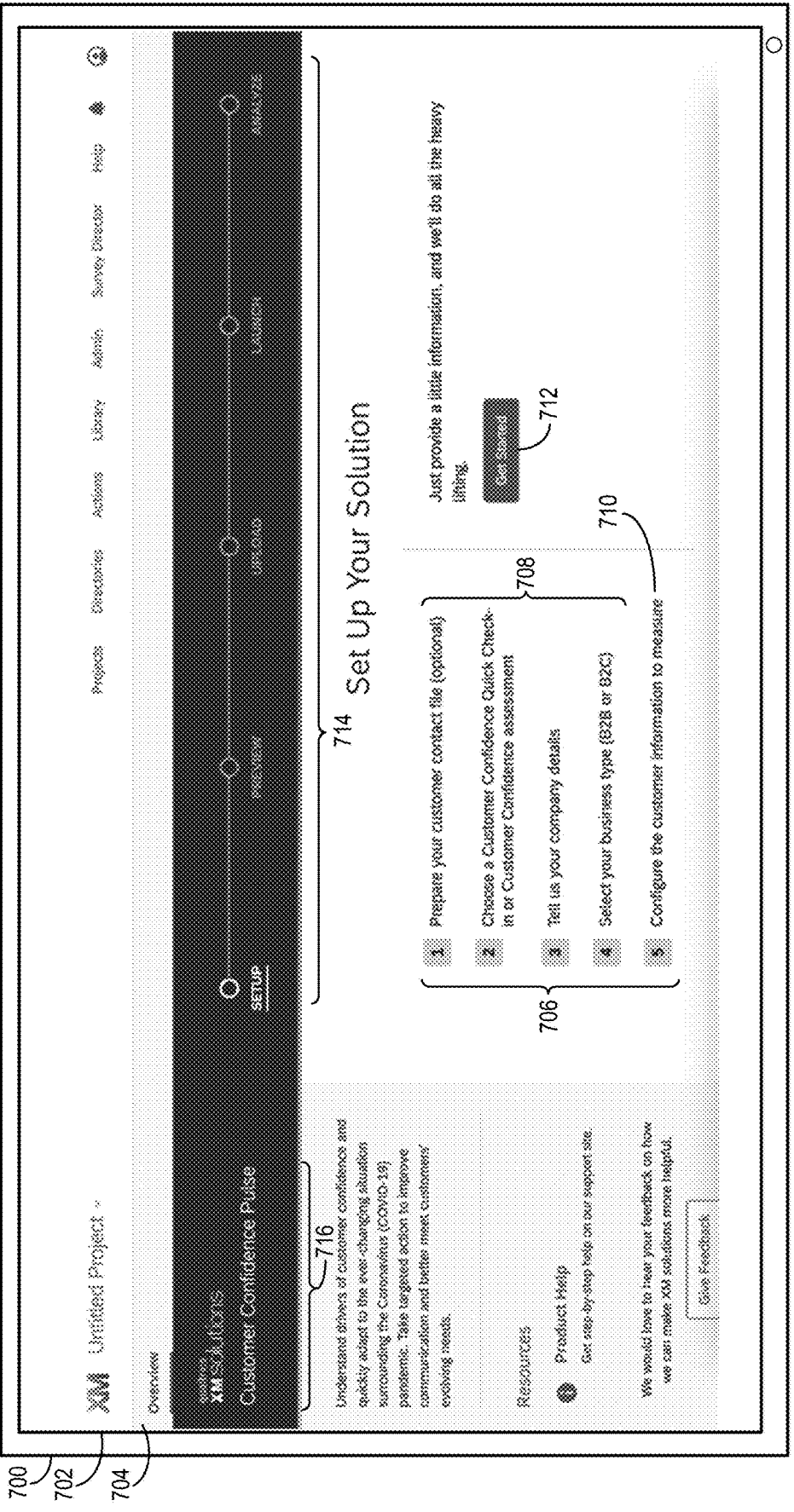
FIGS. 7A-7D illustrate a series of example guided resource user interfaces for presenting one or more prompts in accordance with one or more embodiments.
Figure 7B:
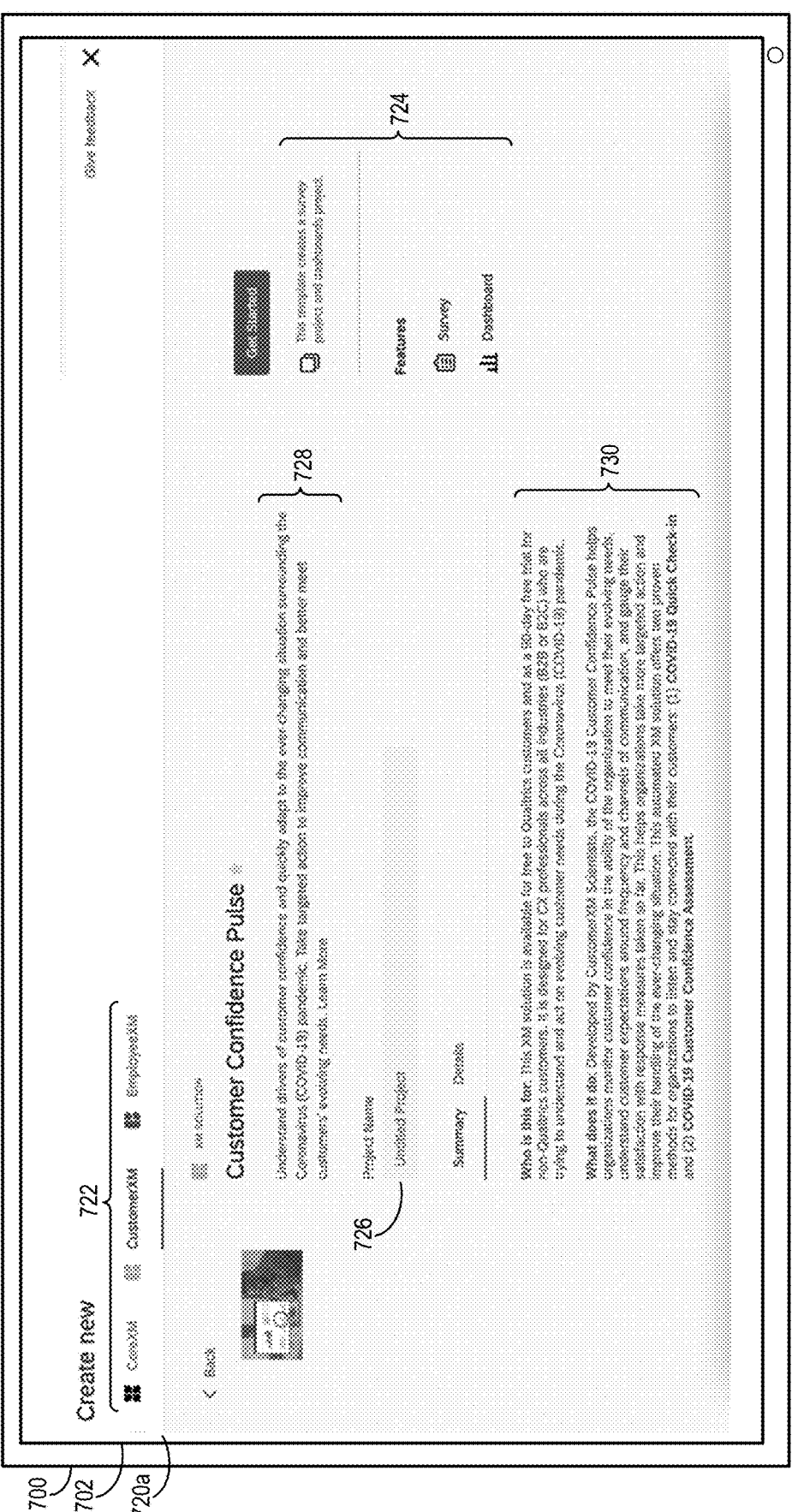
Figure 7C:
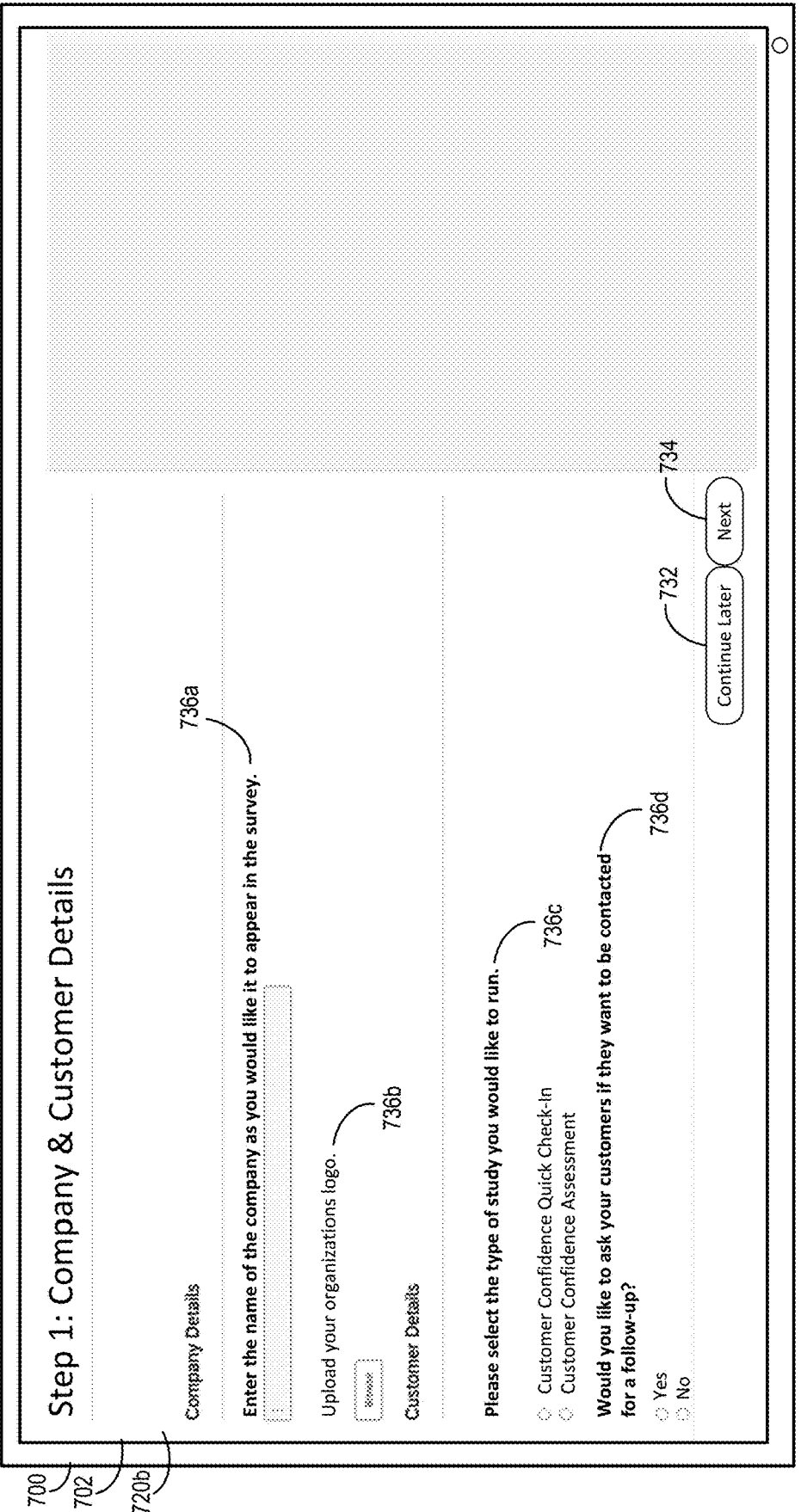
Figure 7D:
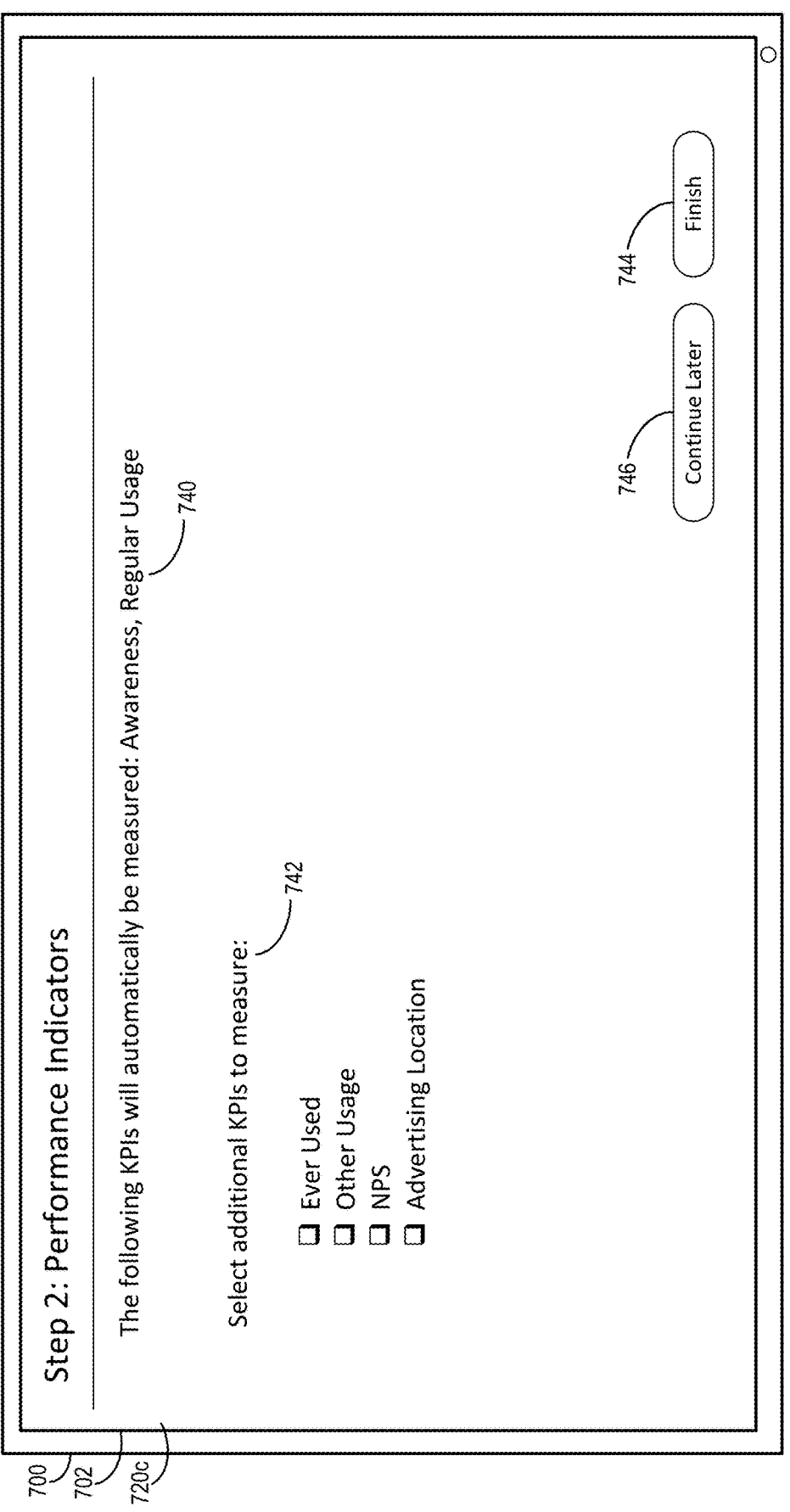

As previously mentioned, the guided resource system 106 provides a guided resource user interface for display via a client device associated with a user. Generally, the guided resource user interface includes a series of one or more prompts for collecting user responses. In particular, FIGS. 7A-7D illustrate a series of example guided resource user interfaces that present a series of one or more prompts. In particular, FIG. 7A illustrates an example overview user interface for providing a preview of the one or more prompts provided as part of the guided resource user interface. FIGS. 7B-7D illustrate example guided resource user interfaces including one or more prompts for collecting user responses in accordance with one or more embodiments. In particular, FIG. 7B illustrates an example guided resource user interface including an overview of the prompts based on the selected objective and platform resources. FIG. 7C illustrates an example guided resource user interface including prompts relating to focus subject data, and FIG. 7D illustrates an example guided resource user interface including prompts relating to performance indictors in accordance with one or more embodiments.

FIG. 7A illustrates an overview user interface 704 on a screen 702 of a client device 700 (e.g., the administrator client device 114). As illustrated in FIG. 7A, the overview user interface 704 includes a prompt preview 706 including a focus subject data prompt preview 708 and a performance indicator prompt preview 710, a guided resource initiation element 712, a timeline element 714, and an objective indicator 716.

As illustrated in FIG. 7A, the overview user interface 704 includes the objective indicator 716. Generally, the objective indicator 716 specifies the objective of the selected prompt flow. As mentioned, the guided resource system 106 may determine the objective based on a user selection of an objective or based on a series of objective prompts. For example, the objective indicator 716 specifies that the objective of the current flow of prompts is to gauge customer confidence.

As further illustrated in FIG. 7A, the overview user interface 704 includes the prompt preview 706. Generally, the prompt preview 706 provides an overview of prompts that the guided resource system 106 will provide to the user. More specifically, the prompt preview 706 includes the focus subject data prompt preview 708 and the performance indicator prompt preview 710. The focus subject data prompt preview 708 indicates prompts for collecting focus subject data. Additionally, the prompt preview 706 includes the performance indicator prompt preview 710. The performance indicator prompt preview 710 indicates prompts for selecting or inputting performance indicators. In some embodiments, the prompt preview 706 includes an overview of prompts that are specific to the platform resource objective as represented by the objective indicator 716.

The overview user interface 704 illustrated in FIG. 7A also includes the guided resource initiation element 712. The client device 700 initiates guided resource user interface by providing the series of prompts based on detecting user selection of the guided resource initiation element 712. In one or more embodiments, the overview user interface 704 also includes an alternative objective element. In particular, the guided resource system 106 provides an element that the user selects to choose a different objective.

As illustrated in FIG. 7A, the overview user interface 704 includes the timeline element 714. The timeline element 714 provides an overview of a timeline of platform resource creation. The timeline provides a simplified view of how many steps the guided resource system 106 has completed and how many steps the guided resource system 106 has yet to complete in creating one or more platform resources. For example, and as illustrated in FIG. 7A, the timeline element 714 indicates that the guided resource system 106 is in the process of creating a platform resource. Additional steps include previewing created platform resources, uploading platform resources, launching the platform resources, and analyzing data collected/analyzed by the platform resources.

FIG. 7A illustrates the overview user interface 704 before the guided resource system 106 provides the series of one or more prompts to the user. Based on an indication that the user selected the guided resource initiation element 712, the client device 700 updates the screen 702 to display the guided resource user interface. FIG. 7B illustrates an example guided resource user interface in accordance with one or more embodiments. In particular, FIG. 7B illustrates a guided resource user interface 720*a* comprising objective selection elements 722, a platform resource indicator 724, a project prompt 726, an objective summary 728, and an objective description 730.

As illustrated in FIG. 7B, the guided resource user interface 720*a* includes the objective selection elements 722. Generally, the objective selection elements 722 indicate the currently selected objective together with additional selectable elements. For example, and as illustrated, the guided resource system 106 indicates that the objective relates to collecting information about customers. Additionally, the guided resource system 106 provides options to select different objectives. For instance, the guided resource system 106 provides an option to select an objective to create a single platform for data collection and analysis (e.g., "Core XM"). Additionally, the guided resource system 106 provides a selectable option to create a platform for collecting and analyzing data related to employee experience.

The guided resource user interface 720a illustrated in FIG. 7B also includes the platform resource indicator 724. Generally, the platform resource indicator 724 specifies what platform resources the guided resource system 106 will generate based on the present series of one or more prompts. For instance, as illustrated in FIG. 7B, the guided resource system 106 will generate two platform resources: a digital survey and a management dashboard. Though not illustrated, in one or more embodiments, the guided resource system 106 provides a platform resource selection element that enables a user to add more platform resources or remove existing platform resources.

The guided resource user interface 720a also includes the project prompt 726. In particular, the project prompt 726 comprises an interactive user interface element by which the guided resource system 106 receives a user generates project name. In some embodiments, the project prompt 726 qualifies as a prompt of the one or more prompts presented as part of the guided resource user interface. More specifically, the guided resource system 106 may, utilize the user response to the project prompt 726 as an initial user response in generating additional prompts and predicted user responses.

Furthermore, the guided resource user interface 720a illustrated in FIG. 7B also includes the objective summary 728 and the objective description 730. Generally, the objective summary 728 and the objective description 730 provide information regarding the selected objective for the platform resources. In particular, the objective summary 728 provides an overview of the purpose of the platform resources. For example, and as illustrated, the objective summary 728 indicates that the current objective of the platform resources is to understand customer confidence and generate targeted actions to improve communication with customers. The objective description 730 provides additional detail regarding the objective and platform resources. For example, the objective description 730 indicates that the guided resource system 106 gauges customer confidence using the following methods within the platform resources: a customer quick check-in and a customer confidence assessment.

As mentioned, the guided resource system 106 provides prompts relating to focus subject data and performance indicators. FIG. 7C illustrates a guided resource user interface comprising prompts relating to focus subject data in accordance with one or more embodiments. FIG. 7D illustrates a guided resource user interface comprising prompts relating to performance indicators in accordance with one or more embodiments. In particular, FIG. 7C illustrates a guided resource user interface 720b on the screen 702 of the client device 700. The guided resource user interface 720b includes prompts 736a-736d, a continue later element 732, and a next element 734.

As illustrated in FIG. 7C, the guided resource user interface 720b includes the prompts 736a-736d. As mentioned previously, the prompts 736a-736d displayed as part of the guided resource user interface 720b ask for user responses relating to focus subject data. For instance, the prompt 736a asks for the user to enter the name of the company. Similarly, the prompts 736b-736d request user responses by which the guided resource system 106 determines focus subject data.

As described previously, the guided resource system 106 analyzes the user response to the prompts 736a-736d to identify corresponding resource items and customize the resource items. For instance, and as illustrated in FIG. 7C, the guided resource system 106 utilizes user responses to the prompt 736c to determine which resource items (e.g., a customer confidence quick check-in and/or a customer confidence assessment) to include within the resource definition file(s). Furthermore, the guided resource system 106 customizes resource items based on user responses to the prompts. In particular, the guided resource system 106 utilizes the user responses to the prompts 736a-736b to customize the resource items to include the name and/or logo of the company.

Furthermore, and as described previously, the guided resource system 106 utilizes the prompts 736a-736d to determine predicted responses and determine additional prompts. Additionally, the guided resource system 106 utilizes the user responses to determine predicted responses. For instance, based on analyzing the user response to the prompt 736a, the guided resource system 106 can generate predicted responses to other prompts. For instance, based on determining that the company is a clothes retailer, the guided resource system 106 determines that other clothes retailers (e.g., belonging within a class of similar responses) commonly answer "no" to the prompt 736d. Based on this determination, the guided resource system 106 may generate a predicted response "no" to the prompt 736d.

As mentioned, the guided resource user interface 720b includes the continue later element 732 and the next element 734. Based on detecting user selection of the continue later element 732, the guided resource system 106 saves the progress and closes the guided resource user interface. Based on detecting user interaction with the next element 734, the client device 700 updates the screen 702 to present more prompts.

FIG. 7C illustrates the guided resource user interface 720b including prompts relating to focus subject data. As mentioned, the guided resource system 106 also provides prompts relating to performance indicators. FIG. 7D illustrates an example guided resource user interface including prompts relating to performance indicators in accordance with one or more embodiments. In particular, FIG. 7D illustrates a guided resource user interface 720c. The guided resource user interface 720c includes a predetermined performance indicator element 740, a prompt 742, a finish element 744, and a continue later element 746.

The guided resource user interface 720 illustrated in FIG. 7D includes the predetermined performance indicator element 740. In particular, the predetermined performance indicator element 740 specifies which performance indicators the guided resource system 106 determined to measure based on responses to the previous prompts. For instance, the guided resource system 106 determines to automatically measure awareness and regular usage. In one or more embodiments, the guided resource system 106 also provides for display, via the guided resource user interface 720c, a predetermined performance indicator customization element. Based on user interaction with the predetermined performance indicator customization element, the guided resource system 106 provides options to modify (i.e., add or remove) predetermined performance indicators.

As further illustrated in FIG. 7D, the guided resource system 106 also provides, via the guided resource user interface 720c, the prompt 742. As mentioned, the prompt 742 is directed toward collecting data relating to performance indicators. More specifically, the prompt 742 requests that the user select performance indicators to measure. Though FIG. 7D illustrates a single prompt, the guided resource system 106 may present additional prompts to collect user responses relating to performance indicators to measure.

The guided resource user interface 720c also includes the continue later element 746 and the finish element 744. Based on detecting selection of the continue later element 746, the guided resource system 106 determines to save the user's progress and exit the guided resource user interface 720c. Based on detection selection of the finish element 744, the guided resource system 106 generates the platform resources based on the received user responses. In one or more embodiments, the guided resource system 106 provides a preview of the one or more platform resources based on selection of the finish element 744.

Figure 8A:
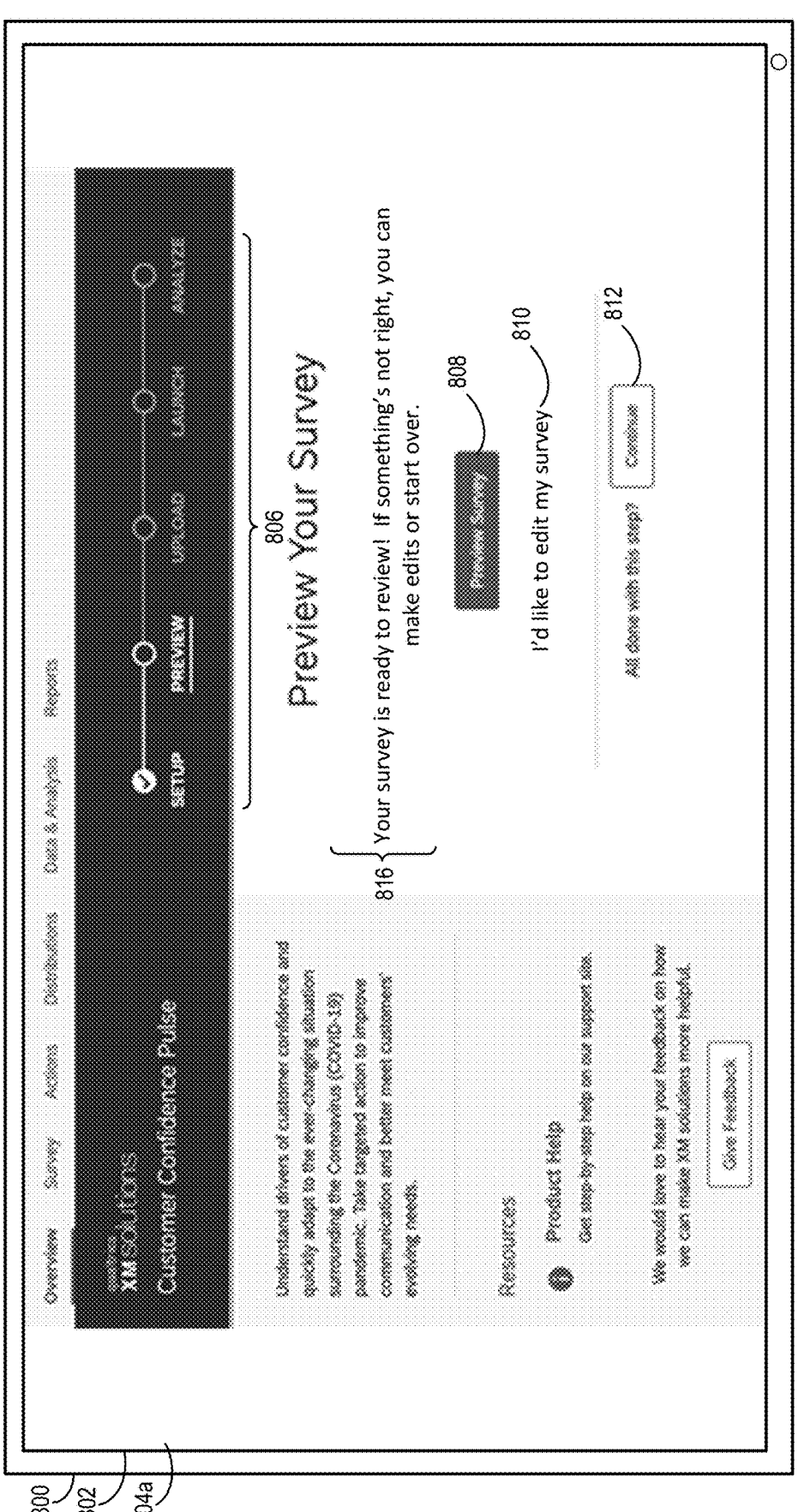
FIGS. 8A-8C illustrate a series of example digital survey management user interfaces for presenting a digital survey and options to modify the digital survey in accordance with one or more embodiments.
Figure 8B:
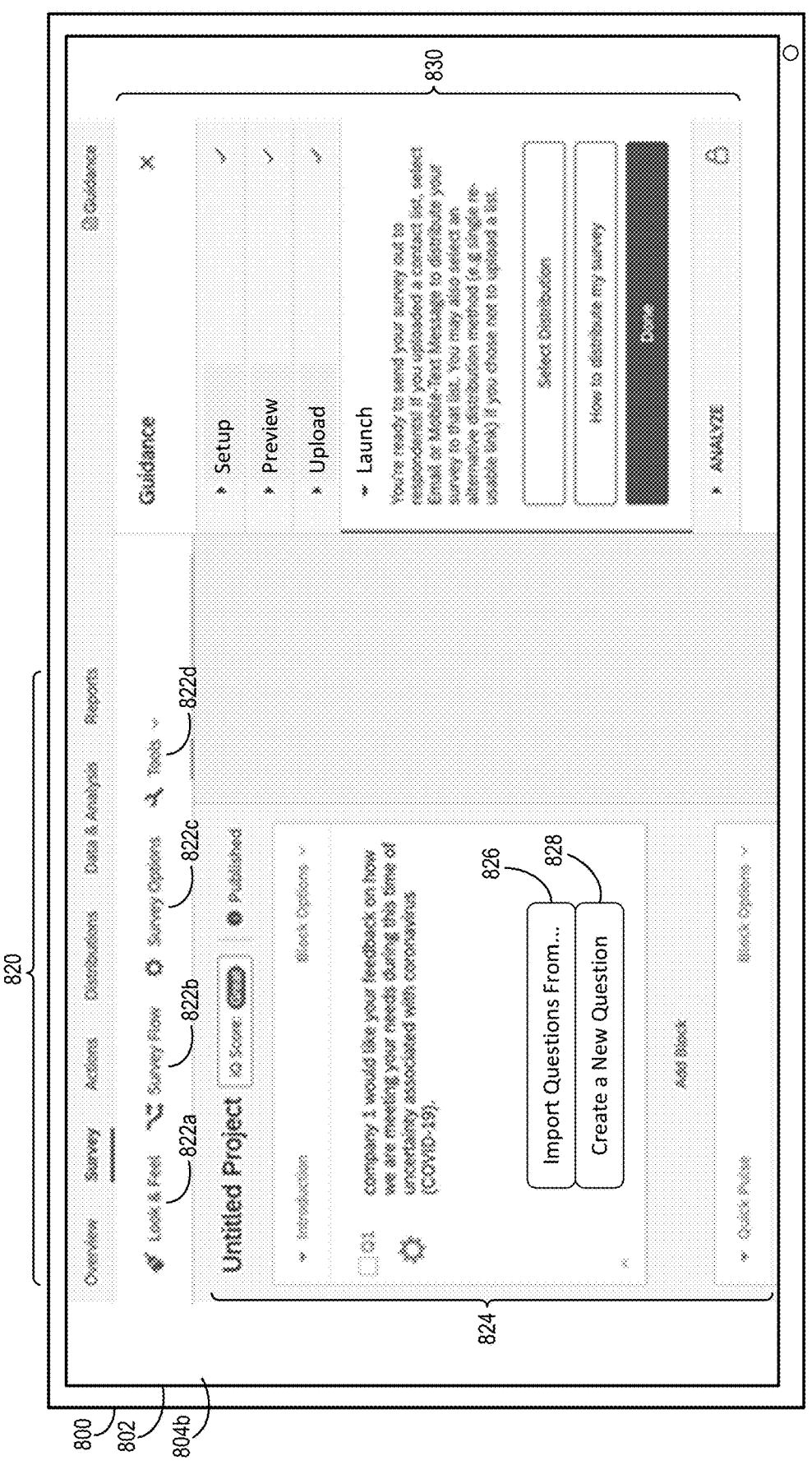
Figure 8C:
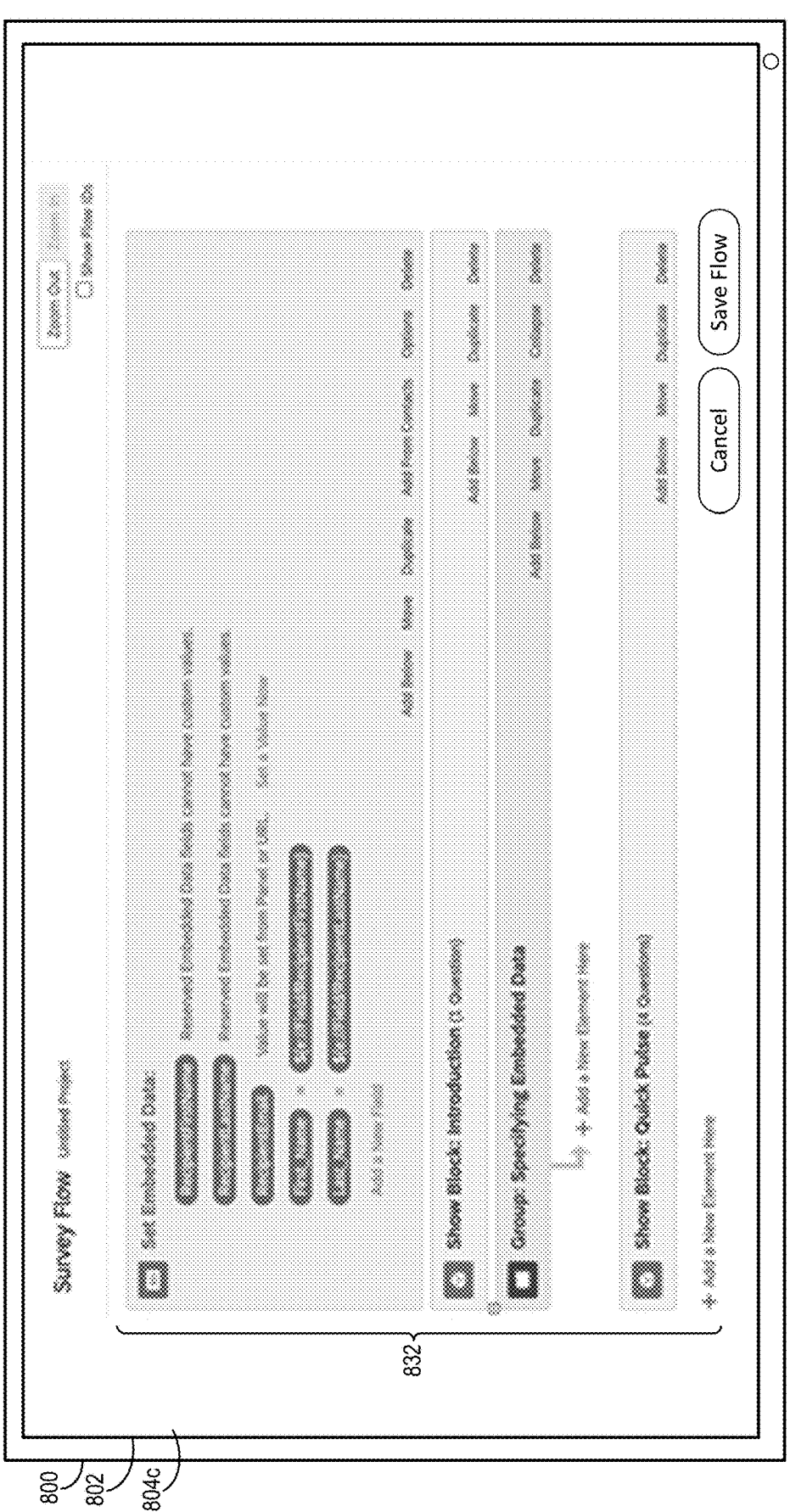
Figure 9:
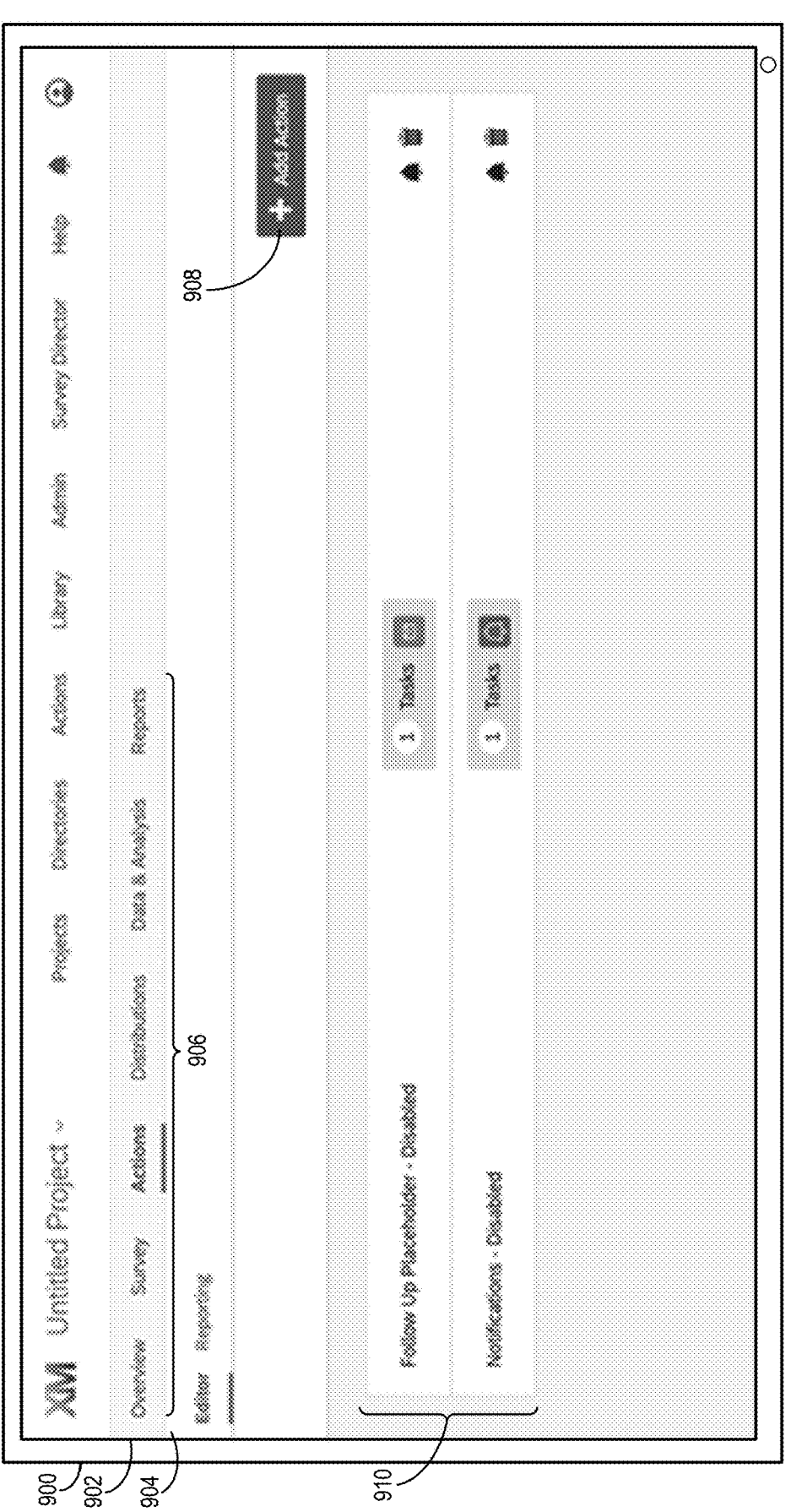
FIG. 9 illustrates an example action item management user interface for previewing and modifying action items in accordance with one or more embodiments.
Figure 10A:
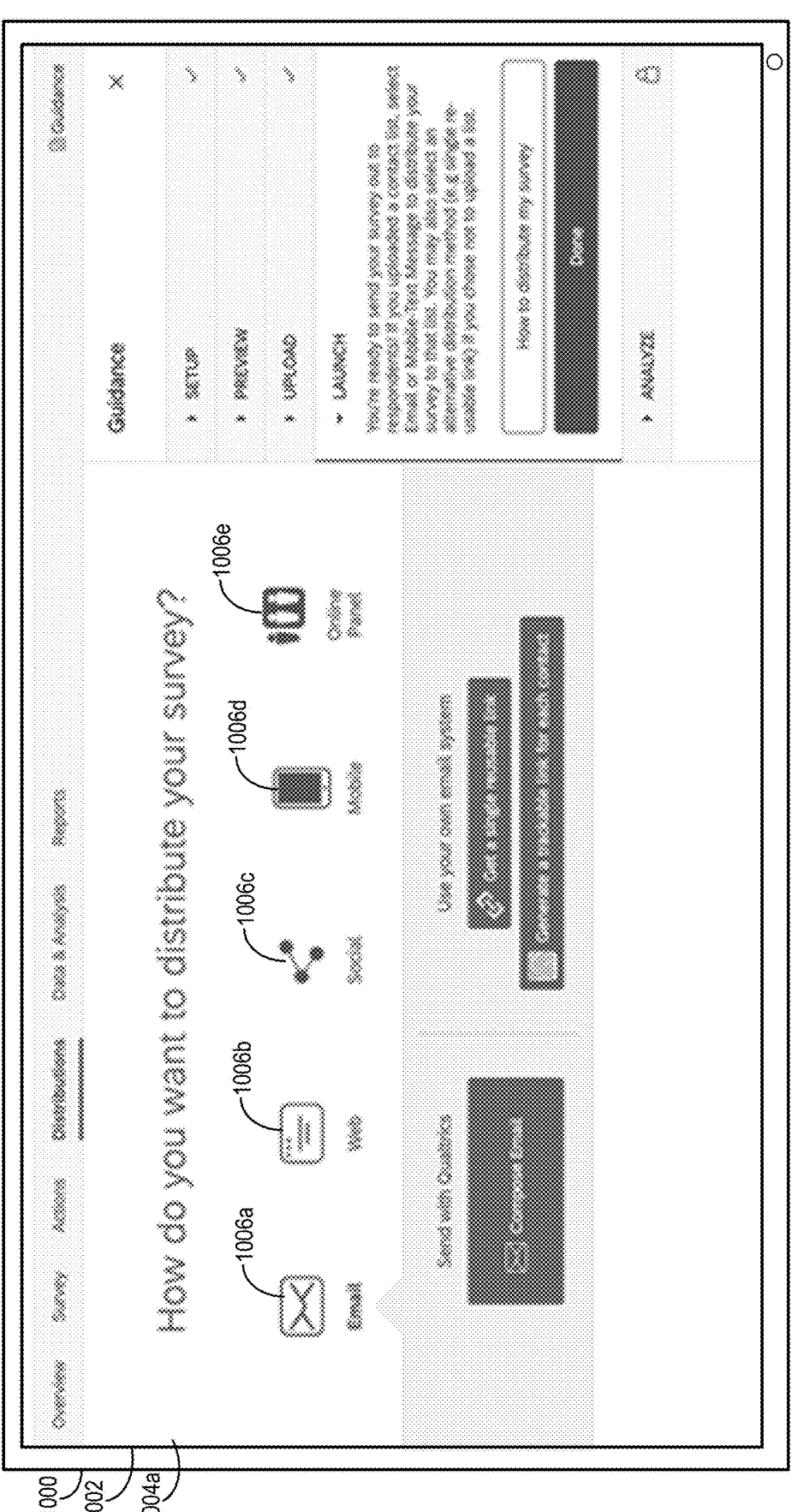
FIGS. 10A-10B illustrate a series of example distribution management user interfaces for presenting and modifying distribution parameters in accordance with one or more embodiments.
Figure 10B:
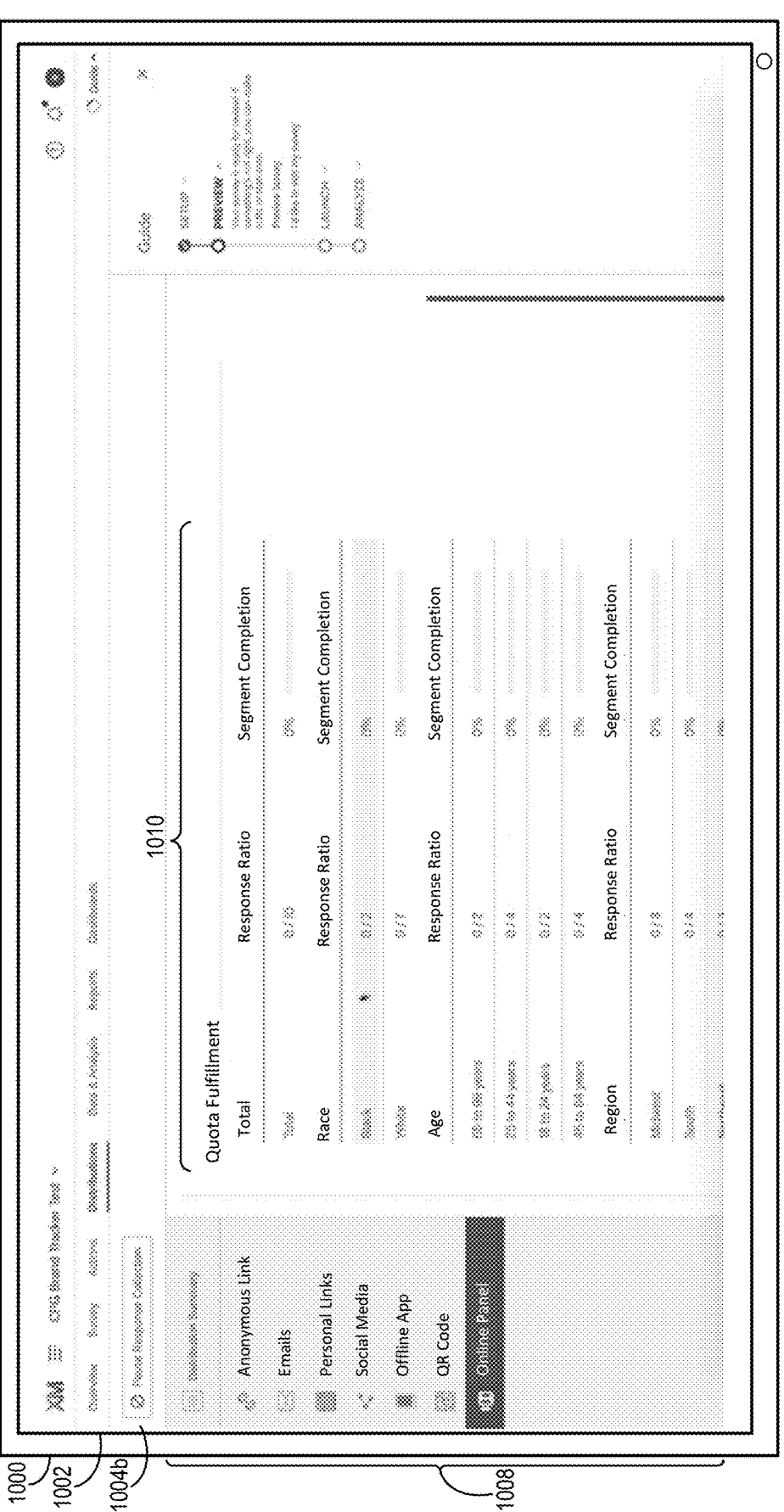
Figure 11A:
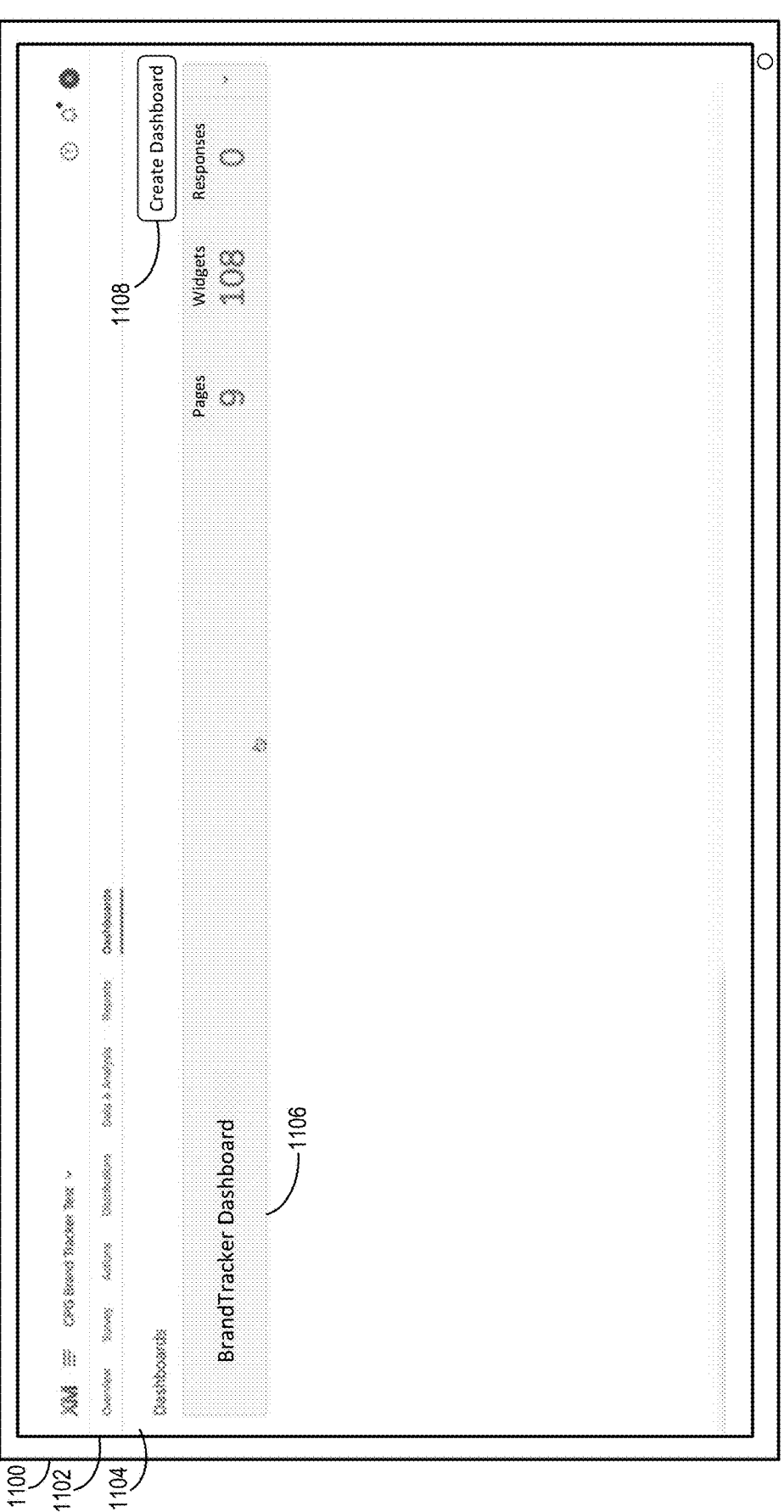
FIGS. 11A-11B illustrate a series of example graphical user interfaces for presenting and modifying one or more management dashboards in accordance with one or more embodiments.
Figure 11B:
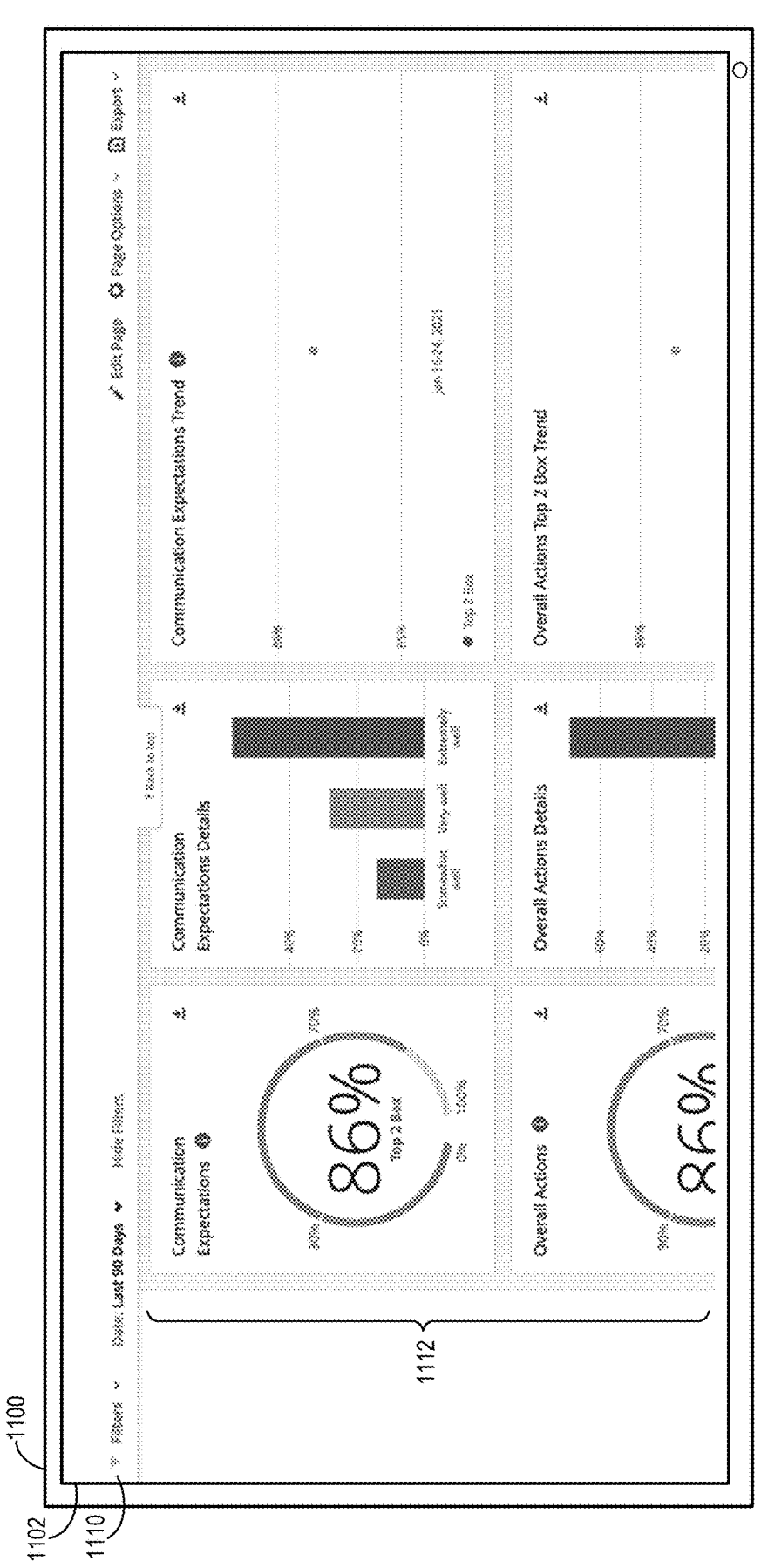

FIGS. 7B-7D illustrate an example guided resource user interface including various prompts to collect user responses in accordance with one or more embodiments. As described above, the guided resource system 106 utilizes user responses to generate different types of platform resources. Namely, the guided resource system 106 generates digital surveys, action items, distribution parameters, and management dashboards among other platform resources. Upon generating these platform resources, the guided resource system 106 provides previews of the platform resources as well as means for modifying or further customizing the platform resources. The following figures illustrate, in greater detail, a series of resource management user interfaces for previewing and managing various platform resources. In one or more embodiments, the resource management user interfaces comprise a digital survey management user interface, an action item management user interface, a distribution management user interface, and a dashboard management user interface. In particular, FIGS. 8A-8C illustrate an example digital survey management user interface for previewing and managing an automatically generated digital survey in accordance with one or more embodiments. FIG. 9 illustrates an action item management user interface for previewing and managing action items in accordance with one or more embodiments. FIGS. 10A-10B illustrate a series of example distribution management user interfaces in accordance with one or more embodiments. FIGS. 11A-11B illustrate an example dashboard management user interface in accordance with one or more embodiments.

As mentioned, FIGS. 8A-8C illustrate a digital survey management user interface in accordance with one or more embodiments. In particular, FIG. 8 illustrates a digital survey management user interface 804a on a screen 802 of a client device 800 (e.g., the administrator client device 114). The digital survey management user interface 804a includes a timeline element 806, a preview platform resource element 808, an edit platform resource element 810, a continue element 812, and a preview description 816. Though FIG. 8A illustrates the digital survey management user interface 804a including information for digital surveys, in some embodiments, the guided resource system 106 presents a similar graphical user interface for other types of platform resources (e.g., management dashboard, action items, etc.).

The digital survey management user interface 804a illustrated in FIG. 8A includes the timeline element 806. Similar to the timeline element 714 (illustrated in FIG. 7A), the timeline element 806 specifies what steps the guided resource system 106 has completed and what steps remain. As illustrated in FIG. 8A, the timeline element 806 indicates that the guided resource system 106 has completed setup (i.e., generation) of the platform resources and will provide a preview of the platform resources. In some embodiments, the timeline element 806 includes additional elements for each platform resource available for preview. For example, the timeline element 806 may include "survey preview," "dashboard preview," "distribution preview," etc. elements.

As illustrated in FIG. 8A, the digital survey management user interface 804a also includes the preview description

816. Generally, the preview description 816 provides an overview of what platform resource is to be previewed. Though not illustrated in FIG. 8A, the preview description 816 can indicate the type and objective of the current platform resource.

The digital survey management user interface 804a illustrated in FIG. 8A also includes the preview platform resource element 808. Based on detecting selection of the preview platform resource element 808, the client device 800 updates the digital survey management user interface 804a to begin displaying a preview of the platform resource.

The digital survey management user interface 804a includes the continue element 812. Based on detecting selection of the continue element 812, the guided resource system 106 skips preview and editing elements and continues to the next step. For instance, the guided resource system 106 may provide, for display via the client device 800, an option to preview the next platform resource or proceed to launching the platform resource(s).

As further illustrated in FIG. 8A, the digital survey management user interface 804a includes the edit platform resource element 810. Based on detecting user interaction with the edit platform resource element 810, the guided resource system 106 provides options for the user to modify and further customize the platform resource. For example, in one embodiment, based on detecting selection of the edit platform resource element 810, the guided resource system 106 updates the digital survey management user interface 804a to include survey editing elements as illustrated in FIGS. 8B-8C.

As mentioned, the guided resource system 106 provides intuitive graphical user interfaces for users to input desired modifications to generated platform resources. FIG. 8B illustrates an example digital survey management user interface by which the guided resource system 106 provides survey prompts and options to modify the survey prompts in accordance with one or more embodiments. FIG. 8C illustrates an example digital survey management user interface by which the guided resource system 106 provides logic flow for a generated digital survey and options to modify the logic flow in accordance with one or more embodiments.

FIG. 8B illustrates a digital survey management user interface 804b displayed on the screen 802 of the client device 800. The digital survey management user interface 804b includes platform resource navigation elements 820, survey modification elements 822a-822d, a survey prompts element 824, an import questions element 826, and timeline navigation elements 830.

As mentioned, the digital survey management user interface 804b includes the platform resource navigation elements 820. The platform resource navigation elements 820 includes elements corresponding to each generated platform resource. Based on detecting user interaction with any one of the platform resource navigation elements 820, the client device 800 updates the graphical user interface to present options to modify the selected platform resource. For example, the guided resource system 106 can provide various user interfaces for modifying action items, distribution parameters, and other platform resources.

Furthermore, the digital survey management user interface 804b includes the survey modification elements 822a-822d. The survey modification elements 822a-822d enable the guided resource system 106 to make user modifications to the digital survey. For instance, based on user selection of the survey modification element 822a, the guided resource system 106 presents optical traits to the user and options for modifying the look and feel of the digital survey when presented to survey respondents. Based on user interaction with the survey modification element 822*b*, the guided resource system 106 presents the survey flow and options to modify the logic flow of the digital survey. Based on user interaction with the survey modification element 822*c*, the guided resource system 106 presents additional survey options that the user can select to add to the digital survey. Additionally, based on detecting user selection of the survey modification element 822*d*, the guided resource system 106 presents various tools by which the guided resource system 106 adds advanced functionalities to the digital survey.

The digital survey management user interface 804*b* illustrated in FIG. 8B also includes the survey prompts element 824. In particular, the survey prompts element 824 presents the survey prompts that are part of the generated digital survey. More specifically, the survey prompts element 824 includes additional elements for modifying the digital survey. In particular, the survey prompts element 824 includes the import questions element 826 and the create new questions element 828. The import questions element 826 enables the guided resource system 106 to import questions or survey prompts selected by the user into the digital survey. Furthermore, based on user selection of the create new question element 828, the guided resource system 106 can add new survey prompts or questions entered by the user.

As further illustrated in FIG. 8B, the digital survey management user interface 804*b* includes the timeline navigation elements 830. The timeline navigation elements 830 provides graphical user interface elements associated with various steps for the generation of platform resources. The timeline navigation elements 830 provides users with an efficient way to navigate between stages of platform resource generation. In particular, based on user interaction with elements within the timeline navigation elements 830, the guided resource system 106 provides different user interfaces for display including, for instance, setup (i.e., the series of prompts), preview, upload, and launch.

As mentioned, FIG. 8C illustrates a digital survey management user interface presenting information regarding a logic flow of a digital survey. In particular, FIG. 8C illustrates a digital survey management user interface 804*c* including a logic flow element 832. The logic flow element includes interactive user interface elements that the user can select and manipulate to modify the logic flow of the digital survey.

As mentioned previously, the guided resource system 106 provides action items for display to the user as well as options to modify the action items. FIG. 9 illustrates an example action item management user interface in accordance with one or more embodiments. In particular, FIG. 9 illustrates an action item management user interface 904 displayed via a screen 902 of a client device 900 (e.g., the administrator client device 114). The action item management user interface 904 includes platform resource navigation elements 906, an add action item element 908, and action items element 910.

As illustrated in FIG. 9, the action item management user interface 904 includes the action items element 910. The action items element 910 includes a display of action items generated by the guided resource system 106. Additionally, the action items element 910 includes user interface elements for modifying the action items. For example, the action items element 910 includes options to add alerts for or remove a particular action item.

The action item management user interface 904 also includes the add action item element 908. Based on user interaction with the add action item element 908, the guided resource system 106 may add additional action items.

As further illustrated in FIG. 9, the action item management user interface 904 includes the platform resource navigation elements 906. The platform resource navigation elements 906 is similar to the platform resource navigation elements 820 (illustrated in FIG. 8B). In particular, based on selection of any one of the elements within the platform resource navigation elements 906, the guided resource system 106 provides the selected platform resource for display to the user.

As mentioned previously, the guided resource system 106 further provides distribution parameters and options to modify the distribution parameters for display to the user. FIGS. 10A-10B illustrate a series of example distribution management user interfaces in accordance with one or more embodiments. In particular, FIG. 10A illustrates a distribution management user interface including different methods for distribution, and FIG. 10B illustrates a distribution management user interface including panel parameters in accordance with one or more embodiments.

FIG. 10A illustrates a distribution management user interface 1004*a* presented via a screen 1002 of a client device 1000. The distribution management user interface 1004*a* includes distribution methods 1006*a*-1006*e*. In particular, the distribution methods 1006*a*-1006*e* include distribution via email, the web, social media, mobile, and an online panel, respectively. In one or more embodiments, the guided resource system 106 determines distribution methods by which to send a digital survey. For instance, in one or more embodiments, the distribution management user interface 1004*a* includes an indication of automatically selected methods for distribution. Based on detecting user selection of the distribution method 1006*e* corresponding to an online panel, the client device 1000 updates the graphical user interface to display data regarding an online panel.

FIG. 10B illustrates an example distribution management user interface providing additional detail regarding online panels. Generally, the digital survey system 104 provides the option of online panels primarily to users who would like to survey more respondents than the users have access to. For instance, a user may not have enough people to which to send the survey via email, social media, etc. The digital survey system 104 and/or the guided resource system 106 provides the online panel method and distributes the digital survey to demographics as specified by determined demographic quotas.

In particular, FIG. 10B illustrates a distribution management user interface 1004*b* presented via the screen 1002 of the client device 1000. In particular, the distribution management user interface 1004*b* includes a distribution methods element 1008 and a distribution quotas element 1010.

The distribution methods element 1008 illustrated in FIG. 10B lists various distribution methods. Based on selection of any one of the distribution methods listed within the distribution methods element 1008, the guided resource system 106 can provide additional details regarding each method. For example, based on selection of the "online panel" element, the guided resource system 106 presents the distribution quotas element 1010 that specifies quotas within an online panel.

In some embodiments, the distribution quotas element 1010 initially displays quotas determined by the guided resource system 106 as part of distribution parameters. The distribution quotas element 1010 also includes interactive user interface elements that the user can select and modify. For instance, by selecting any of the numbers within the "response ratio" column, the guided resource system 106 can modify the number of required responses from each demographic group. Additionally, the guided resource system 106 may provide a demographic group modification element that enables users to select demographic groups to add or remove from the quotas that are part of the distribution parameters.

As mentioned, the guided resource system 106 provides management dashboards for display to the user as well as options for a user to modify the management dashboards. FIGS. 11A-11B illustrate a series of graphical user interfaces for presenting and modifying one or more management dashboards in accordance with one or more embodiments. In particular, FIG. 11A illustrates an example dashboard management user interface that displays an overview of all management dashboards associated with a user or a project. Upon detecting selection of a single dashboard, the guided resource system 106 provides the user interface illustrated in FIG. 11B. In particular, FIG. 11B illustrates a selected dashboard management user interface that presents a single management dashboard as well as elements to modify the particular management dashboard.

FIG. 11A illustrates a dashboard management user interface 1104 presented via a screen 1102 of a client device 1100 (e.g., the administrator client device 114). The dashboard management user interface 1104 includes a management dashboard element 1106 and a create dashboard element 1108.

Generally, the management dashboard element 1106 illustrated in FIG. 11A includes one or more management dashboards associated with the user. In particular, the management dashboard element 1106 includes all management dashboards associated with a single user or management dashboards associated with a project managed by the user. The management dashboard element 1106 also provides a snapshot of information associated with each dashboard. In particular, the management dashboard element 1106 can indicate how many pages, widgets, responses, other platform resources, alerts, etc. are associated with a particular management dashboard. For instance, as illustrated in FIG. 11A, the "BrandTracker Dashboard" contains 9 pages, 108 widgets, and 0 responses. In some embodiments, the guided resource system 106 provides additional detail regarding a particular management dashboard based on selection of the particular management dashboard.

As further illustrated in FIG. 11A, the dashboard management user interface 1104 includes a create dashboard element 1108. Based on selection of the create dashboard element 1108, the guided resource system 106 provides user interface elements to create a new management dashboard. In at least one embodiment, the guided resource system 106 provides a guided series of prompts to the user to aid in generating a new management dashboard.

FIG. 11A illustrates an overview of one or more management dashboards associated with a user in accordance with one or more embodiments. Based upon a user selection of a particular dashboard, the guided resource system 106 provides additional information regarding the particular dashboard. FIG. 11B illustrates an example selected dashboard management user interface in accordance with one or more embodiments. In particular, FIG. 11B illustrates a selected dashboard management user interface 1110 presented via the screen 1102 of the client device 1100.

Generally, the selected dashboard management user interface 1110 provides specifics relating to a particular or selected management dashboard. As illustrated in FIG. 11B, the selected dashboard management user interface 1110 includes a widgets element 1112. The widgets element 1112 displays widgets associated with the selected management dashboard. Widgets present specific segments of data that are relevant to a user. In one or more embodiments, the widgets elements 1112 includes interactive elements for modifying widgets within a management dashboard. For instance, based on user selection of the "edit page" element, the guided resource system 106 can reorganize, remove, add, or otherwise modify widgets within the management dashboard.

Figure 12:
FIG. 12 illustrates a flowchart of a series of acts in a method of generating a resource definition file in accordance with one or more embodiments.
Figure 12:
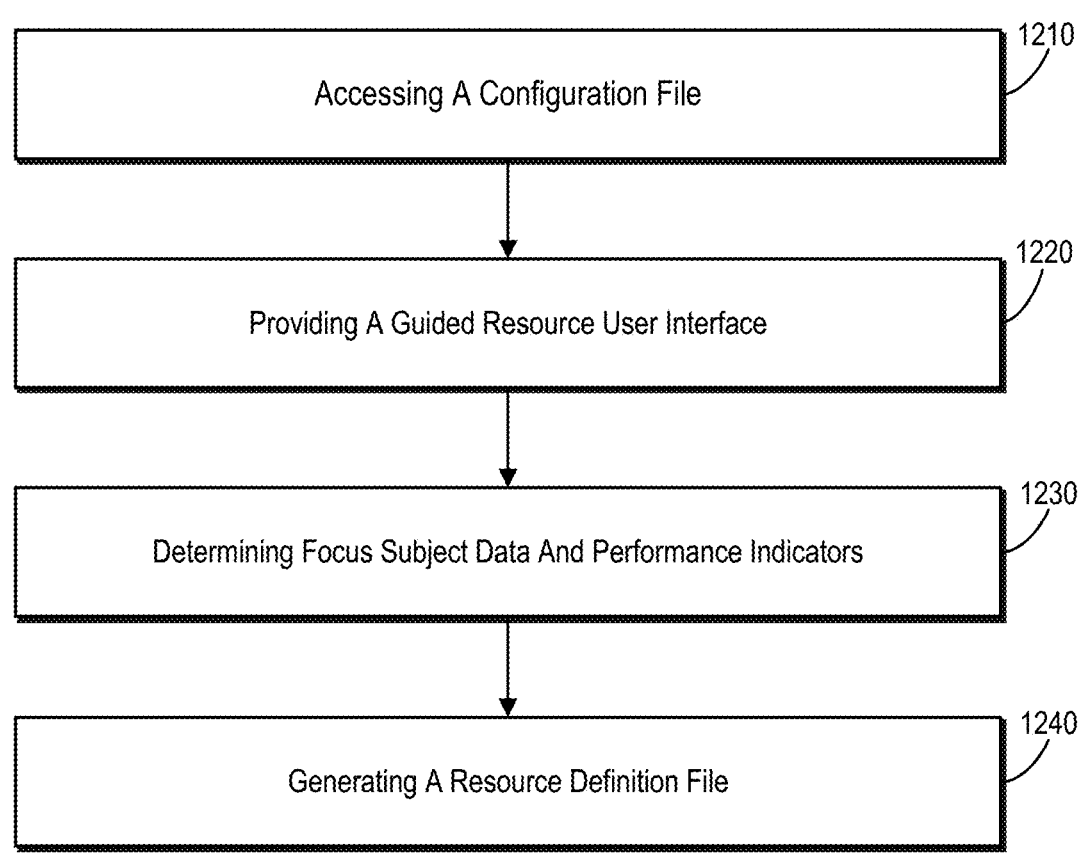

FIGS. 1-11, the corresponding text, and the examples provide a number of different methods, systems, devices, and non-transitory computer readable media of the guided resource system 106. In addition to the foregoing, one or more embodiments can also be described in terms of flowcharts comprising acts for accomplishing the particular result, as shown in FIG. 12. The acts illustrated in FIG. 12 may be performed with more or fewer acts. Further, the illustrated acts may be performed in different orders. Additionally, the acts described herein may be repeated or performed in parallel with one another or in parallel with different instances of the same or similar acts.

FIG. 12 illustrates a flowchart of a series of acts 1200 for generating a resource definition file based on user responses. In particular, the series of acts 1200 includes an act 1210 of accessing a configuration file, an act 1220 of providing a guided resource user interface, an act 1230 of determining focus subject data and performance indicators, and an act 1240 of generating a resource definition file.

As illustrated in FIG. 12, the series of acts 1200 includes the act 1210 of accessing a configuration file. In particular, the act 1210 comprises accessing a configuration file comprising potential resource items.

As illustrated in FIG. 12, the series of acts 1200 includes the act 1220 of providing a guided resource user interface. In particular, the act 1220 comprises providing, for display via a client device associated with a user, a guided resource user interface. In some embodiments, the act 1220 further comprises providing the guided resource user interface by providing, for display via the client device, one or more prompts relating to at least one of the focus subject data or the performance indicators. Furthermore, in one or more embodiments, the act 1220 further comprises an additional act of providing the guided resource user interface by: receiving an initial user response; based on the initial user response, generating a predicted response; providing the predicted response for display via the guided resource user interface; and receiving an indication of a user selection of the predicted response. More specifically, the additional act can comprise generating the predicted response by: analyzing the initial user response to identify a class of similar responses; and determining the predicted response based on analyzing the class of similar responses.

As further illustrated in FIG. 12, the series of acts 1200 includes the act 1230 of determining focus subject data and performance indicators. In particular, the act 1230 comprises determining, based on user responses received via the guided resource user interface, focus subject data and performance indicators. In some embodiments, the act 1230 further comprises receiving the user responses by: receiving a user indication of external data; and accessing the external data.

The series of acts 1200 illustrated in FIG. 12 also includes the act 1240 of generating a resource definition file. In particular, the act 1240 comprises generating a resource definition file by filtering the configuration file based on the user responses, wherein the resource definition file comprises resource items. In some embodiments, the act 1240 further comprises generating the resource definition file by: determining mappings between the user responses and a set of resource items of the potential resource items; and determine to include the set of resource items within the resource definition file.

In one or more embodiments, the series of acts 1200 includes an additional act of generating a platform resource based on the resource definition file by utilizing an orchestration engine, wherein the platform resource comprises resource elements corresponding to the resource items. More specifically, in some embodiments the platform resource comprises at least one of a digital survey, distribution parameters, a management dashboard, or a set of actions.

Additionally, in some embodiments, the series of acts 1200 includes an additional act of customizing the resource items within the resource definition file based on the user responses.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
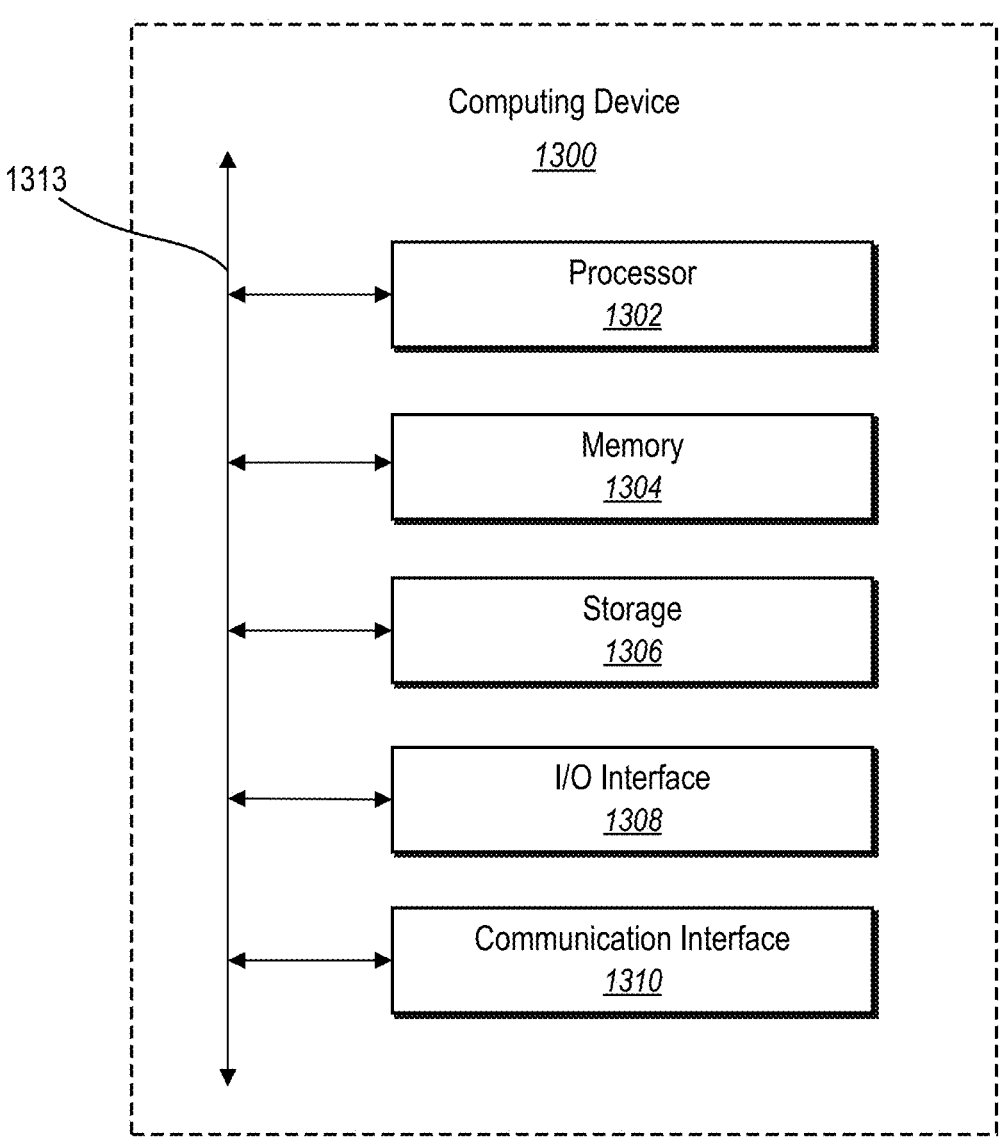
FIG. 13 illustrates a block diagram of an example computing device for implementing one or more embodiments of the present disclosure.

FIG. 13 illustrates a block diagram of a computing device 1300 that may be configured to perform one or more of the processes described above associated with the guided resource system 106. One will appreciate that one or more computing devices, such as the computing device 1300 may represent the computing devices described above (e.g., the server device 102, the administrator client device 114, and the recipient client devices 118). In one or more embodiments, the computing device 1300 may be a non-mobile device (e.g., a desktop computer or another type of client device). In some embodiments, the computing device 1300 may be a mobile device (e.g., a mobile telephone, a smartphone, a PDA, a tablet, a laptop, a camera, a tracker, a watch, a wearable device, etc.). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or simply "I/O interfaces 1308"), and a communication interface 1310, which may be communicatively coupled by way of a communication infrastructure (e.g., bus 1313). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1313. The bus 1313 can include hardware, software, or both that connects components of computing device 1300 to each other.

Figure 14:
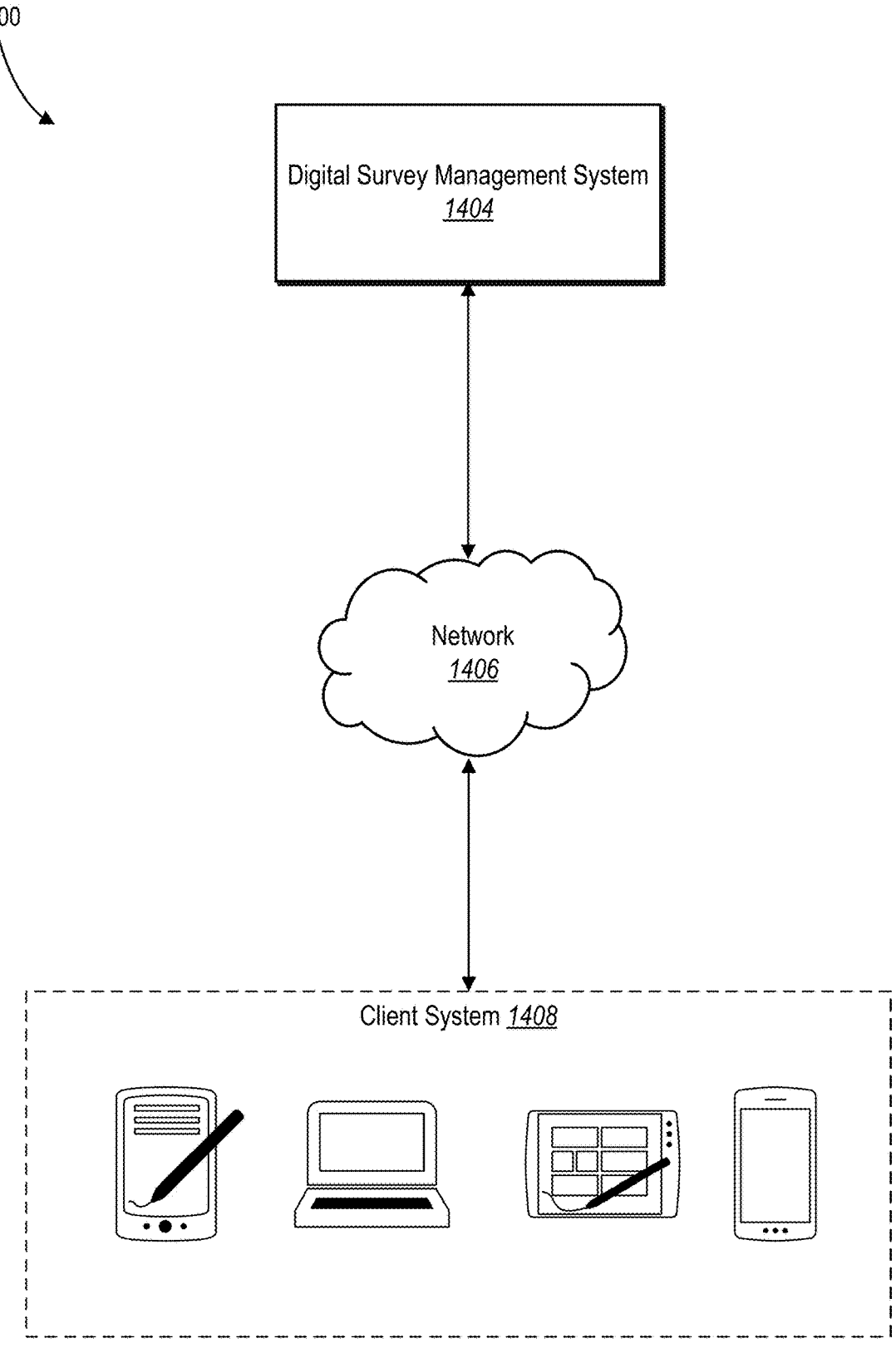
FIG. 14 illustrates an example network environment of a guided resource system in accordance with one or more embodiments described herein.

FIG. 14 illustrates a network environment 1400 of a digital survey system 104, such as embodiments of the guided resource system 106 within the digital survey system 104, as described herein. The network environment 1400 includes the digital survey system 104 and a client device 1406 connected to each other by a network 1404. Although FIG. 14 illustrates a particular arrangement of the digital survey system 104, the client device 1406, and the network 1404, one will appreciate that other arrangements of the network environment 1400 are possible. For example, a client device of the client device 1406 is directly connected to the digital survey system 104. Moreover, this disclosure contemplates any suitable number of client systems 1408, digital survey systems, and networks are possible. For instance, the network environment 1400 includes multiple client systems 1408.

This disclosure contemplates any suitable network. As an example, one or more portions of the network 1404 may include an ad hoc network, an intranet, an extranet, a VPN, a LAN, a wireless LAN, a WAN, a wireless WAN, a MAN, a portion of the Internet, a portion of the Public Switched Telephone Network (PSTN), a cellular telephone network, a safelight network, or a combination of two or more of these. The term "network" may include one or more networks and may employ a variety of physical and virtual links to connect multiple networks together.

In particular embodiments, the client device 1406 is an electronic device including hardware, software, or embedded logic components or a combination of two or more such components and capable of carrying out the appropriate functionalities implemented or supported by the client system. As an example, the client device 1406 includes any of the computing devices discussed above. The client device 1406 may enable a user at the client device 1406 to access the network 1404. Further, the client device 1406 may enable a user to communicate with other users at other client systems.

In some embodiments, the client device 1406 may include a web browser, such as and may have one or more add-ons, plug-ins, or other extensions. The client device 1406 may render a web page based on the HTML files from the server for presentation to the user. For example, the client device 1406 renders the graphical user interface described above.

In one or more embodiments, the digital survey system 104 includes a variety of servers, sub-systems, programs, modules, logs, and data stores. In some embodiments, digital survey system 104 includes one or more of the following: a web server, action logger, API-request server, relevance-and-ranking engine, content-object classifier, notification controller, action log, third-party-content-object-exposure log, inference module, authorization/privacy server, search module, user-targeting module, user-interface module, user-profile store, connection store, third-party content store, or location store. The digital survey system 104 may also include suitable components such as network interfaces, security mechanisms, load balancers, failover servers, management-and-network-operations consoles, other suitable components, or any suitable combination thereof.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method comprising:

accessing, based on a user input indicating a resource objective comprising a resource goal, a configuration file of a plurality of configuration files comprising potential resource items for configuring platform resources;

providing, for display via a client device associated with a user, a guided resource user interface comprising prompts based on the resource objective and a navigation timeline to navigate between one or more steps associated with generating digital surveys based on the resource objective;

determining, based on user responses received via the guided resource user interface, focus subject data comprising a focus subject and performance indicators comprising a type of performance measurement;

generating, utilizing an orchestration engine, a resource definition file that dictates parameters for organizing a platform resource by filtering the configuration file using a templating language to pare down the configuration file by:

determining mappings between user responses received via the guided resource user interface and a subset of the potential resource items from the configuration file associated with the focus subject and the type of performance measurement;

determining whether to include the subset of the potential resource items within the resource definition file; and including, based on the mappings, the subset of the potential resource items within the resource definition file;

providing, based on a user interaction with the navigation timeline, a user interface associated with a step of the one or more steps associated with generating digital surveys based on the resource objective, wherein the user interface comprises a prompt populated with a predicted response based on an identification of the focus subject for modifying the resource definition file; and modifying the resource definition file that dictates the parameters for organizing the platform resource by customizing the subset of the potential resource items in the resource definition file to include the identification of the focus subject and the predicted response based on user responses received via the guided resource user interface.

2. The method as recited in claim 1, further comprising generating a platform resource based on the resource definition file by utilizing the orchestration engine, wherein the platform resource comprises resource elements corresponding to the subset of the potential resource items.

3. The method as recited in claim 2, wherein the platform resource comprises at least one of a digital survey, distribution parameters, a management dashboard, or a set of actions.

4. The method as recited in claim 1, further comprising:

receiving, in response to an initial prompt via the guided resource user interface, a user response comprising an attribute; and based on the user response, customizing the subset of the potential resource items within the resource definition file to include the attribute provided by the user response in one or more additional prompts for modifying the resource definition file.

5. The method as recited in claim 1, wherein the guided resource user interface further comprises:

a selectable option to switch between the resource objective and an additional resource objective;

an objective indicator specifying an objective for a prompt flow based on the resource objective; and action items comprising tasks corresponding to the resource objective.

6. The method as recited in claim 1, further comprising updating, based on including the subset of the potential resource items within the resource definition file, an additional resource definition file to include the subset of the potential resource items, wherein the additional resource definition file dictates the parameters of an additional platform resource.

7. The method as recited in claim 1, further comprising:

mapping a plurality of configuration files to resource objectives comprising resource goals associated with particular platform resources; and accessing, based on a user input indicating a selection of the resource objective of the resource objectives comprising the resource goal, the configuration file of the plurality of configuration files comprising potential resource items.

8. The method as recited in claim 1, further comprising providing the guided resource user interface by:

receiving an initial user response;

based on the initial user response, generating a an initial predicted response;

providing the initial predicted response for display via the guided resource user interface; and receiving an indication of a user selection of the initial predicted response.

9. The method as recited in claim 8, further comprising generating the initial predicted response by:

analyzing the initial user response to identify a class of similar responses; and determining the initial predicted response based on analyzing the class of similar responses.

10. A system comprising:

at least one processor; and at least one non-transitory computer readable storage medium comprising instructions that, when executed by the at least one processor, cause the system to:

access, based on a user input indicating a resource objective comprising a resource goal, a configuration file of a plurality of configuration files comprising potential resource items for configuring platform resources;

provide, for display via a client device associated with a user, a guided resource user interface comprising prompts based on the resource objective and a navigation timeline to navigate between one or more steps associated with generating digital surveys based on the resource objective;

determine, based on user responses received via the guided resource user interface, focus subject data comprising a focus subject and performance indicators comprising a type of performance measurement;

generate, utilizing an orchestration engine, a resource definition file that dictates parameters for organizing a platform resource by filtering the configuration file using a templating language to pare down the configuration file by:

determining mappings between user responses received via the guided resource user interface and a subset of the potential resource items from the configuration file associated with the focus subject and the type of performance measurement;

determining whether to include the subset of the potential resource items within the resource definition file; and including, based on the mappings, the subset of the potential resource items within the resource definition file;

provide, based on a user interaction with the navigation timeline, a user interface associated with a step of the one or more steps associated with generating digital surveys based on the resource objective, wherein the user interface comprises a prompt populated with a predicted response based on an identification of the focus subject for modifying the resource definition file; and modify the resource definition file that dictates the parameters for organizing the platform resource by customizing the subset of the potential resource items in the resource definition file to include the identification of the focus subject and the predicted response based on user responses received via the guided resource user interface.

11. The system as recited in claim 10, further comprising:

mapping a plurality of configuration files to resource objectives comprising resource goals associated with particular platform resources; and accessing, based on a user input indicating a selection of the resource objective of the resource objectives comprising the resource goal, the configuration file of the plurality of configuration files comprising potential resource items.

12. The system as recited in claim 11, wherein a platform resource comprises at least one of a digital survey, distribution parameters, a management dashboard, or a set of actions.

13. The system as recited in claim 10, further comprising instructions that, when executed by the at least one processor, cause the system to:

receive, in response to an initial prompt via the guided resource user interface, a user response comprising an attribute; and based on the user response, customize the subset of the potential resource items, utilizing the orchestration engine, within the resource definition file to include the attribute provided by the user response in one or more prompts for modifying the resource definition file.

14. The system as recited in claim 10, wherein the guided resource user interface further comprises:

a selectable option to switch between the resource objective and an additional resource objective;

an objective indicator specifying an objective for a prompt flow based on the resource objective; and action items comprising tasks corresponding to the resource objective.

15. The system as recited in claim 14, further comprising instructions that, when executed by the at least one processor, cause the system to:

receive an indication of a user selection of the additional resource objective;

provide, based on the user selection, an additional predicted response for display via the guided resource user interface;

receive an indication of a user selection of the additional predicted response; and modify the resource definition file by customizing the resource definition file to include the additional predicted response based on the user selection.

16. A non-transitory computer-readable medium storing instructions that, when executed by at least one processor, cause a computing device to:

access, based on a user input indicating a resource objective comprising a resource goal, a configuration file of a plurality of configuration files comprising potential resource items for configuring platform resources;

provide, for display via a client device associated with a user, a guided resource user interface comprising prompts based on the resource objective and a navigation timeline to navigate between one or more steps associated with generating digital surveys based on the resource objective;

determine, based on user responses received via the guided resource user interface, focus subject data comprising a focus subject and performance indicators comprising a type of performance measurement;

generate, utilizing an orchestration engine, a resource definition file that dictates parameters for organizing a platform resource by filtering the configuration file using a templating language to pare down the configuration file by:

determining mappings between user responses received via the guided resource user interface and a subset of the potential resource items from the configuration file associated with the focus subject and the type of performance measurement;

determining whether to include the subset of the potential resource items within the resource definition file; and including, based on the mappings, the subset of the potential resource items within the resource definition file;

provide, based on a user interaction with the navigation timeline, a user interface associated with a step of the one or more steps associated with generating digital surveys based on the resource objective, wherein the user interface comprises a prompt populated with a predicted response based on an identification of the focus subject for modifying the resource definition file; and modify the resource definition file that dictates the parameters for organizing the platform resource by customizing the subset of the potential resource items in the resource definition file to include the identification of the focus subject and the predicted response based on user responses received via the guided resource user interface.

17. The non-transitory computer-readable medium as recited in claim 16, further comprising instructions that, when executed by the at least one processor, cause the computing device to generate a platform resource based on the resource definition file by utilizing the orchestration engine, wherein the platform resource comprises resource elements corresponding to the subset of the potential resource items.

18. The non-transitory computer-readable medium as recited in claim 17, wherein the platform resource comprises at least one of a digital survey, distribution parameters, a management dashboard, or a set of actions.

19. The non-transitory computer-readable medium as recited in claim 16, further comprising instructions that, when executed by the at least one processor, cause the computing device to customize the subset of the potential resource items within the resource definition file, utilizing the orchestration engine, based on the user responses to the prompts from modifying the resource definition file.

20. The non-transitory computer-readable medium as recited in claim 16, further comprising instructions that, when executed by the at least one processor, cause the computing device to:

provide, via the guided resource user interface, a selectable option to switch between the resource objective and an additional resource objective;

receive an indication of a user selection of the additional resource objective; and provide, based on the user selection, an additional predicted response for display via the guided resource user interface.

\* \* \* \* \*